June 19, 1934.         O. TWEIT         1,963,537
PIPE CUTTING MACHINE
Filed Dec. 12, 1929    13 Sheets-Sheet 1
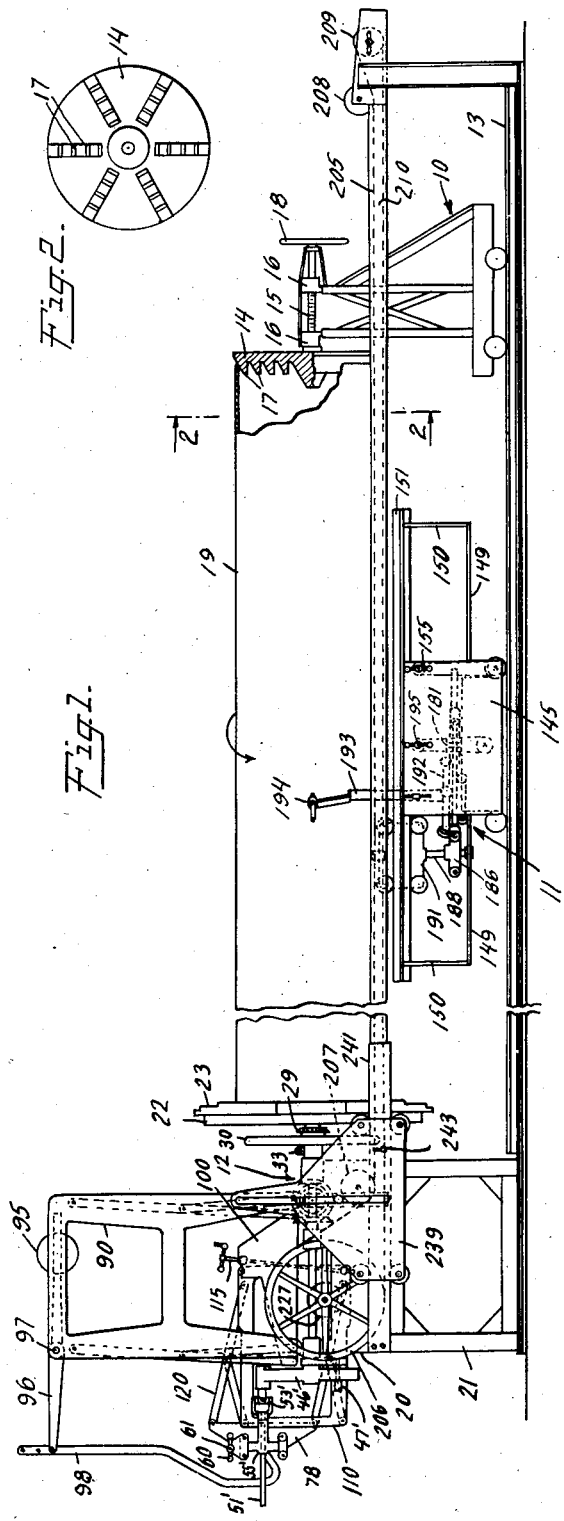
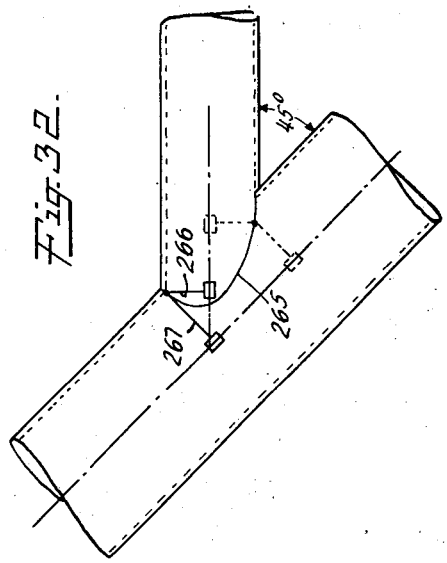
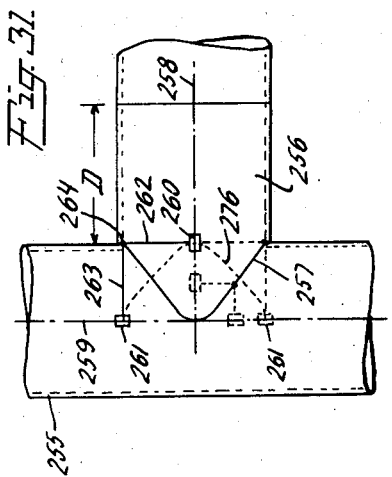
INVENTOR
Olav Tweit
BY
ATTORNEY

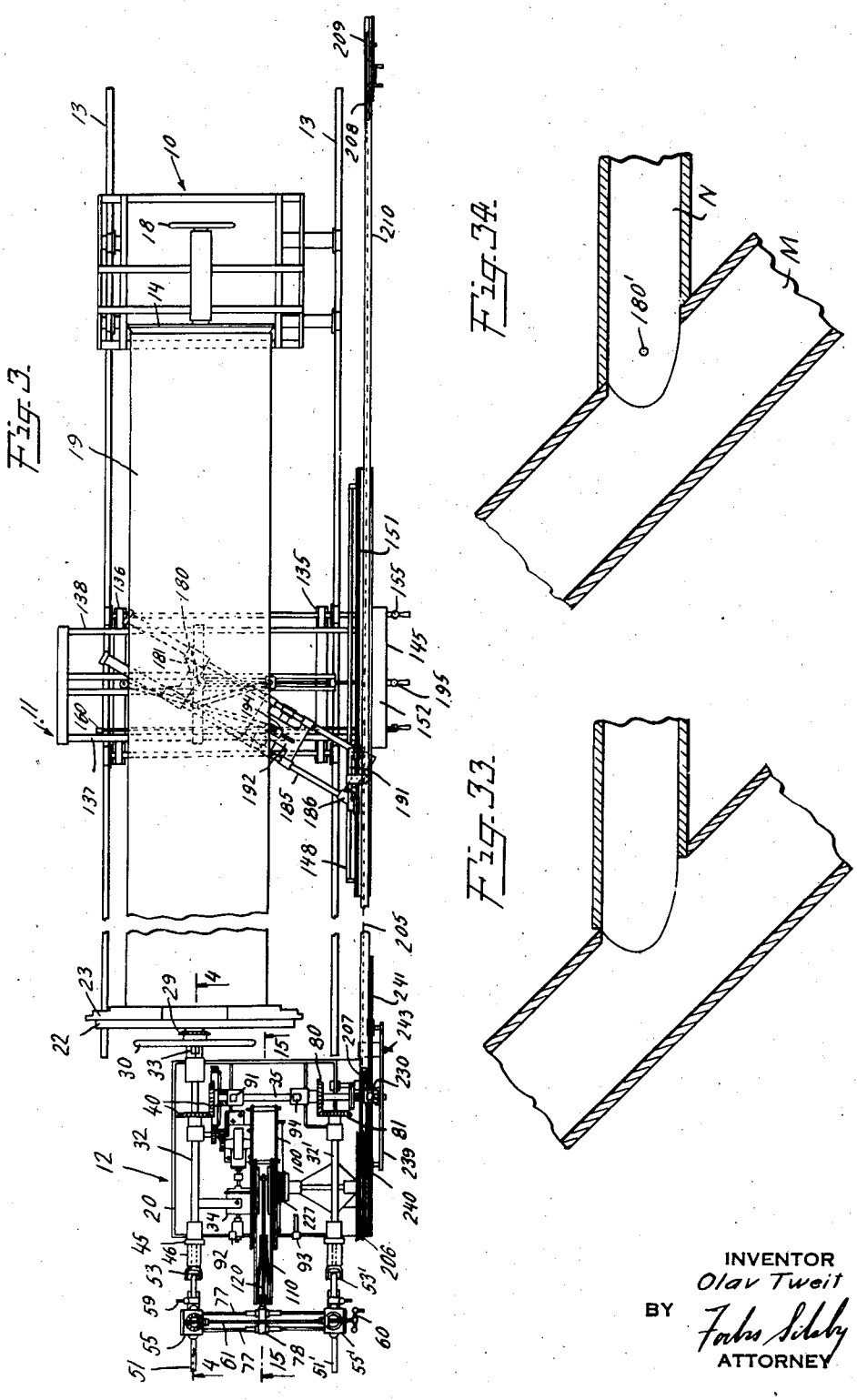

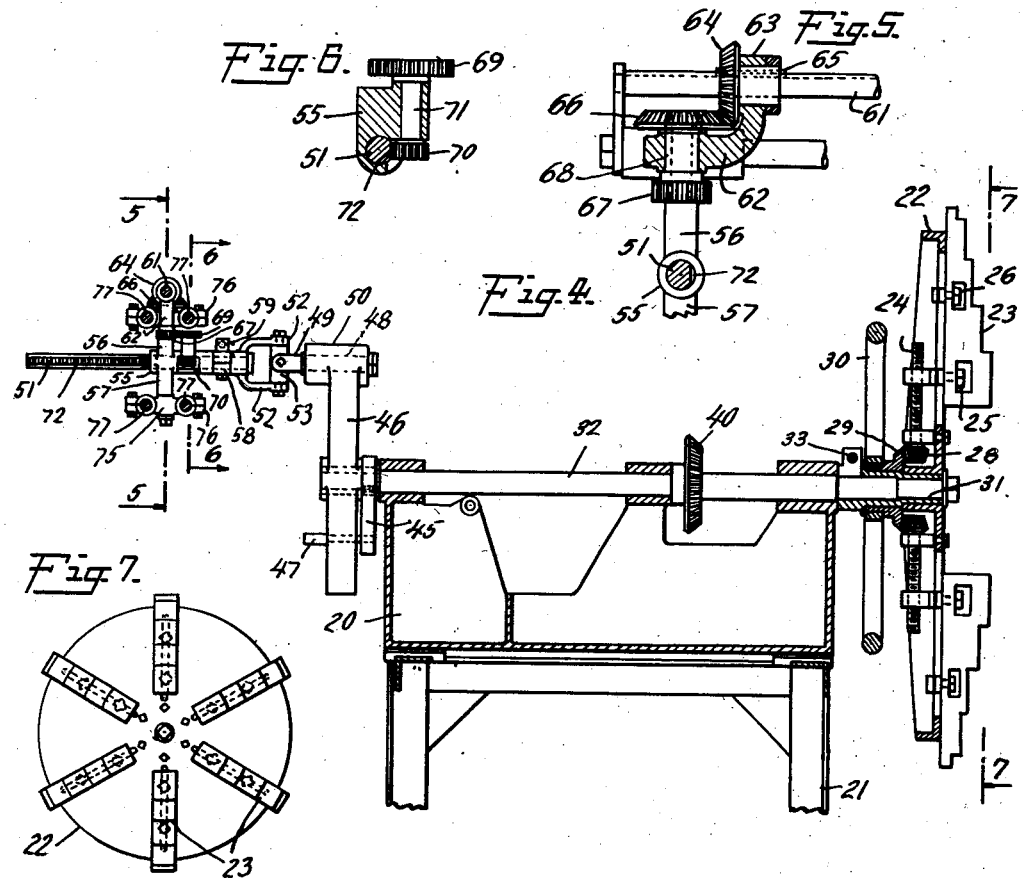
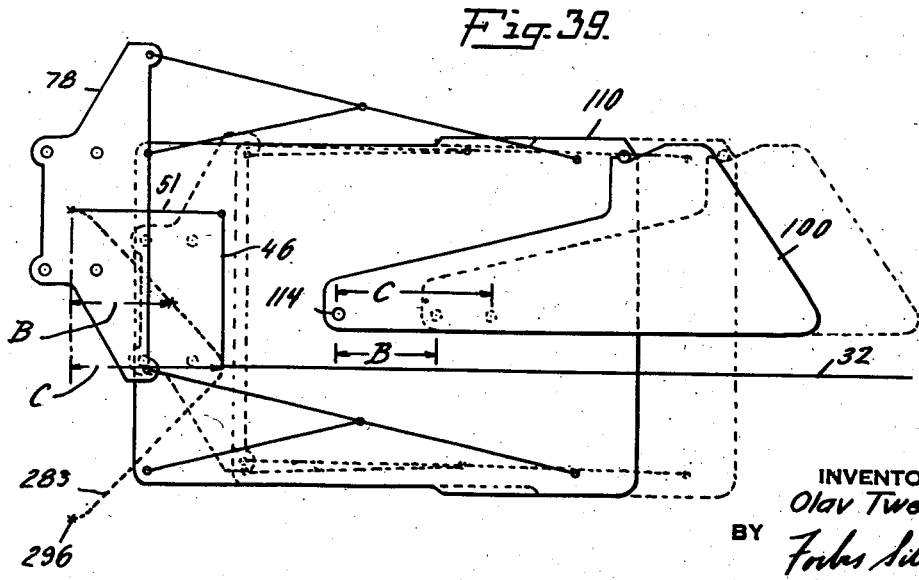

June 19, 1934.   O. TWEIT   1,963,537
PIPE CUTTING MACHINE
Filed Dec. 12, 1929    13 Sheets-Sheet 4
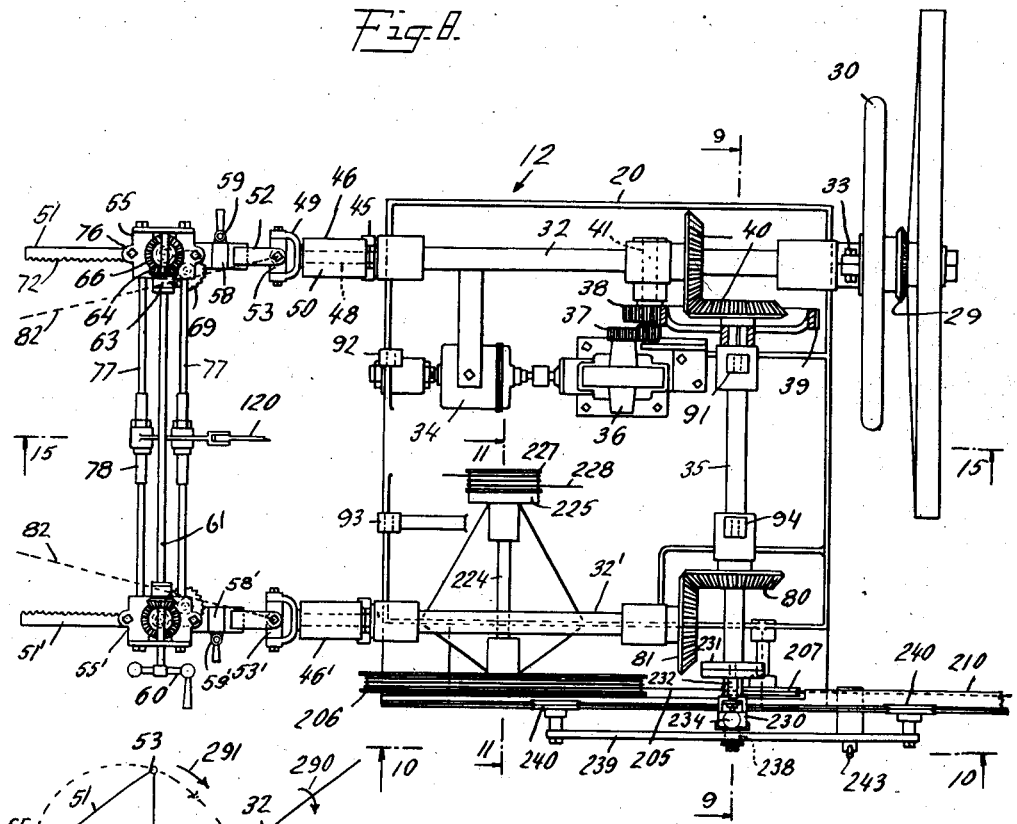
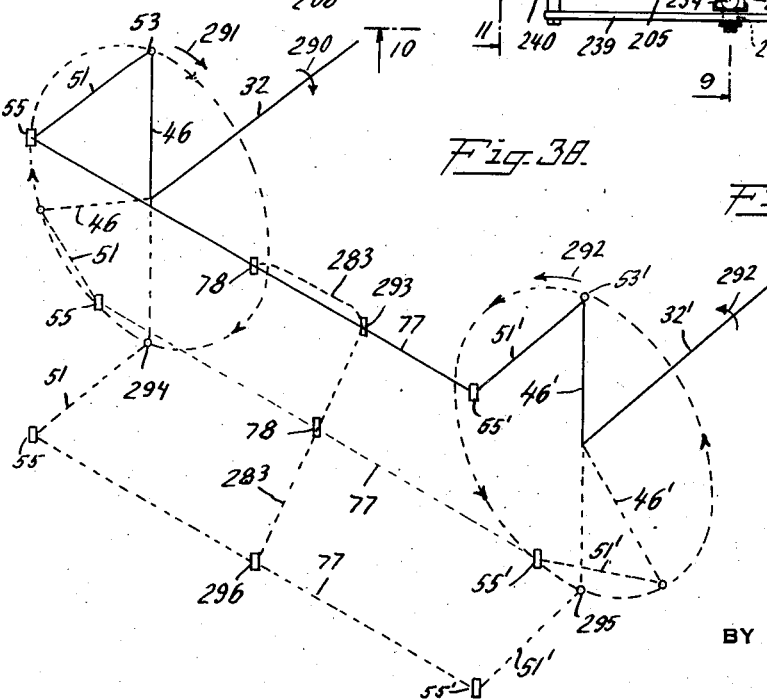
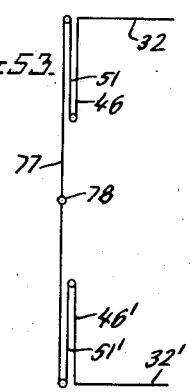
INVENTOR
Olav Tweit
BY
ATTORNEY June 19, 1934.   O. TWEIT   1,963,537
PIPE CUTTING MACHINE
Filed Dec. 12, 1929   13 Sheets-Sheet 5
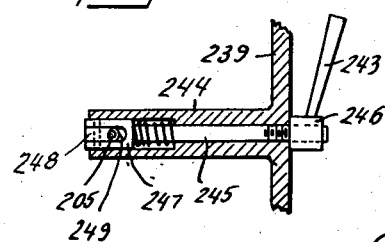
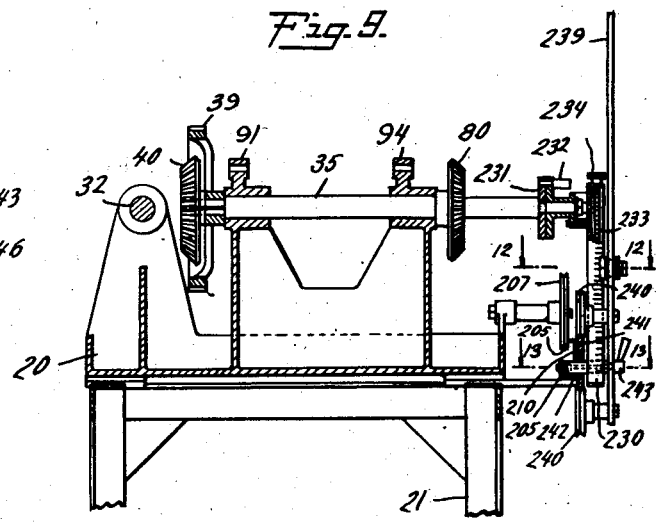
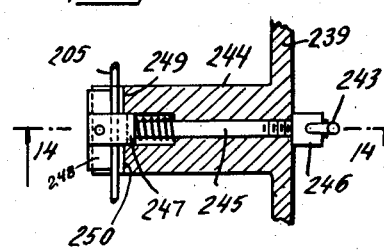
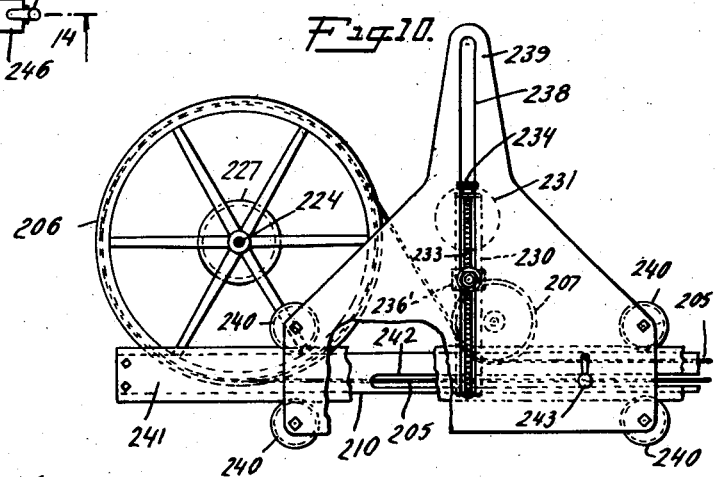
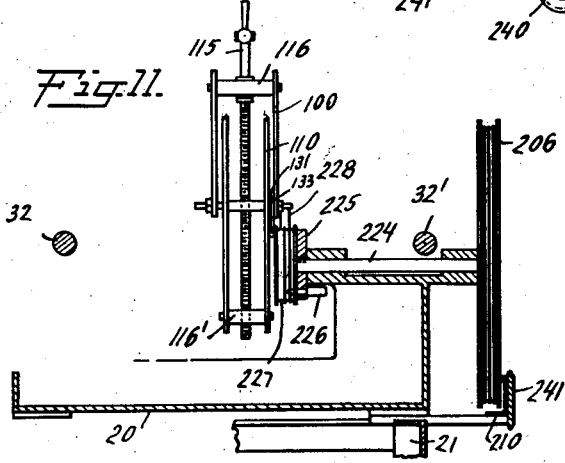
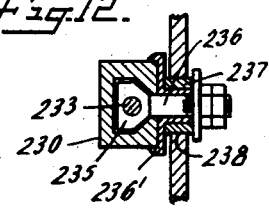
INVENTOR
Olav Tweit
BY
ATTORNEY

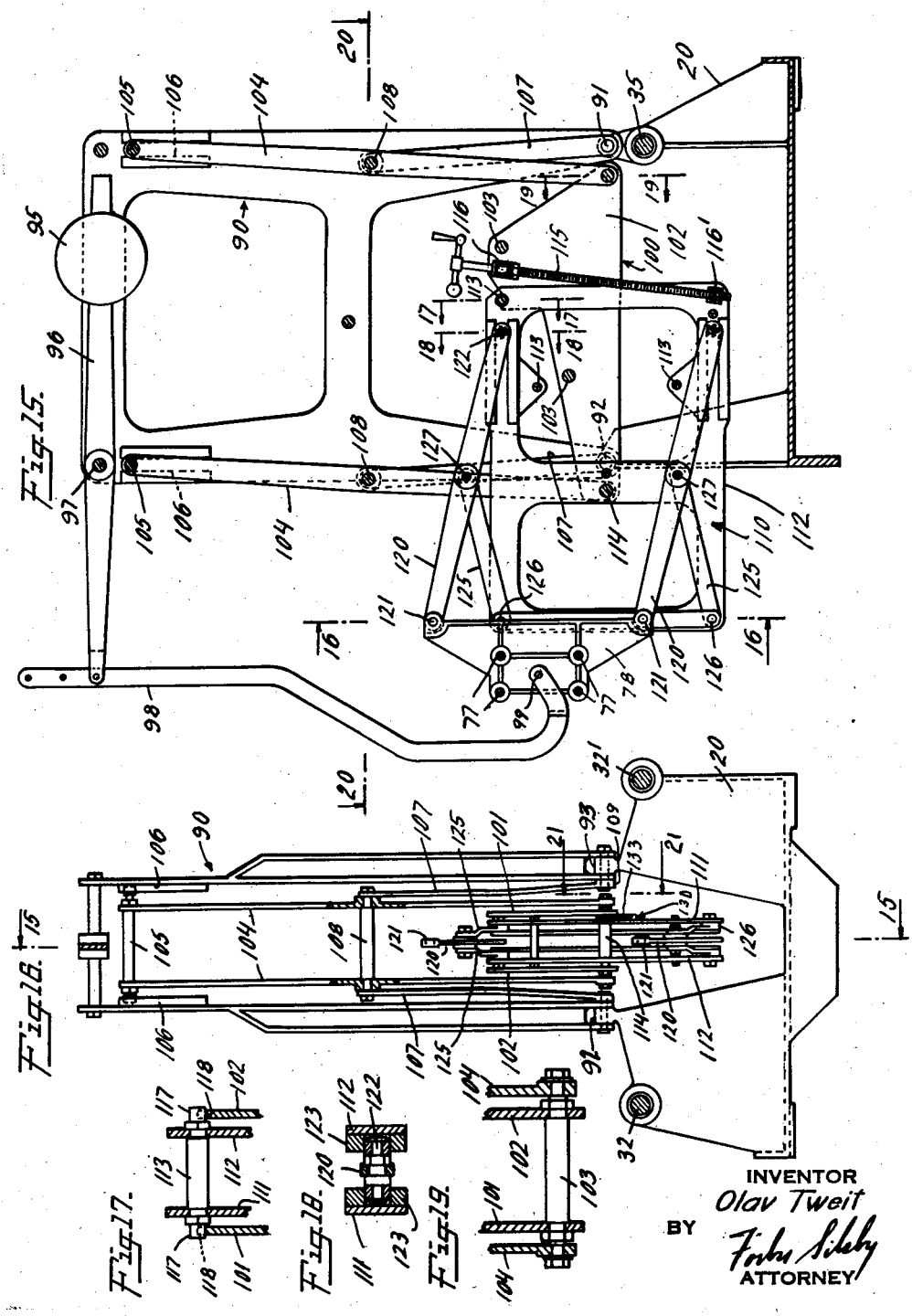

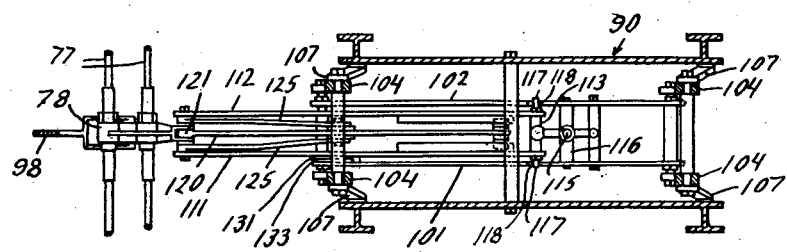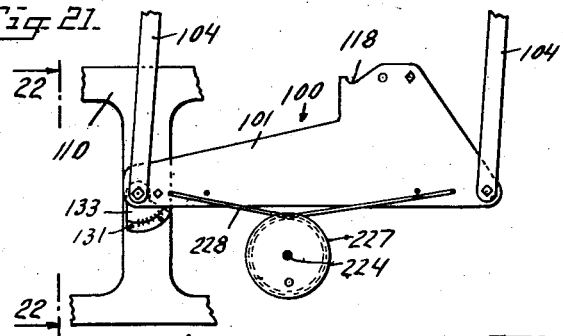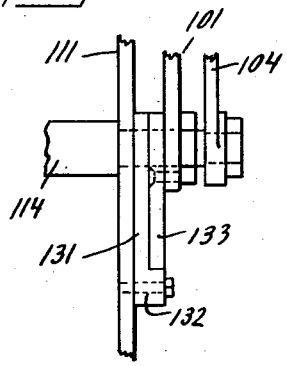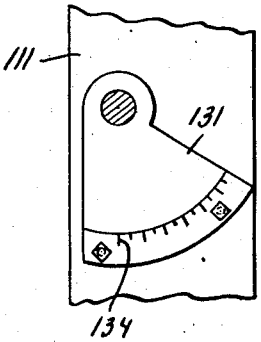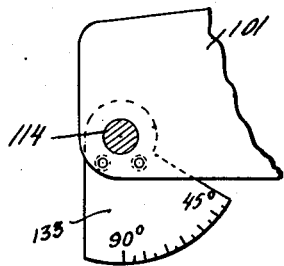

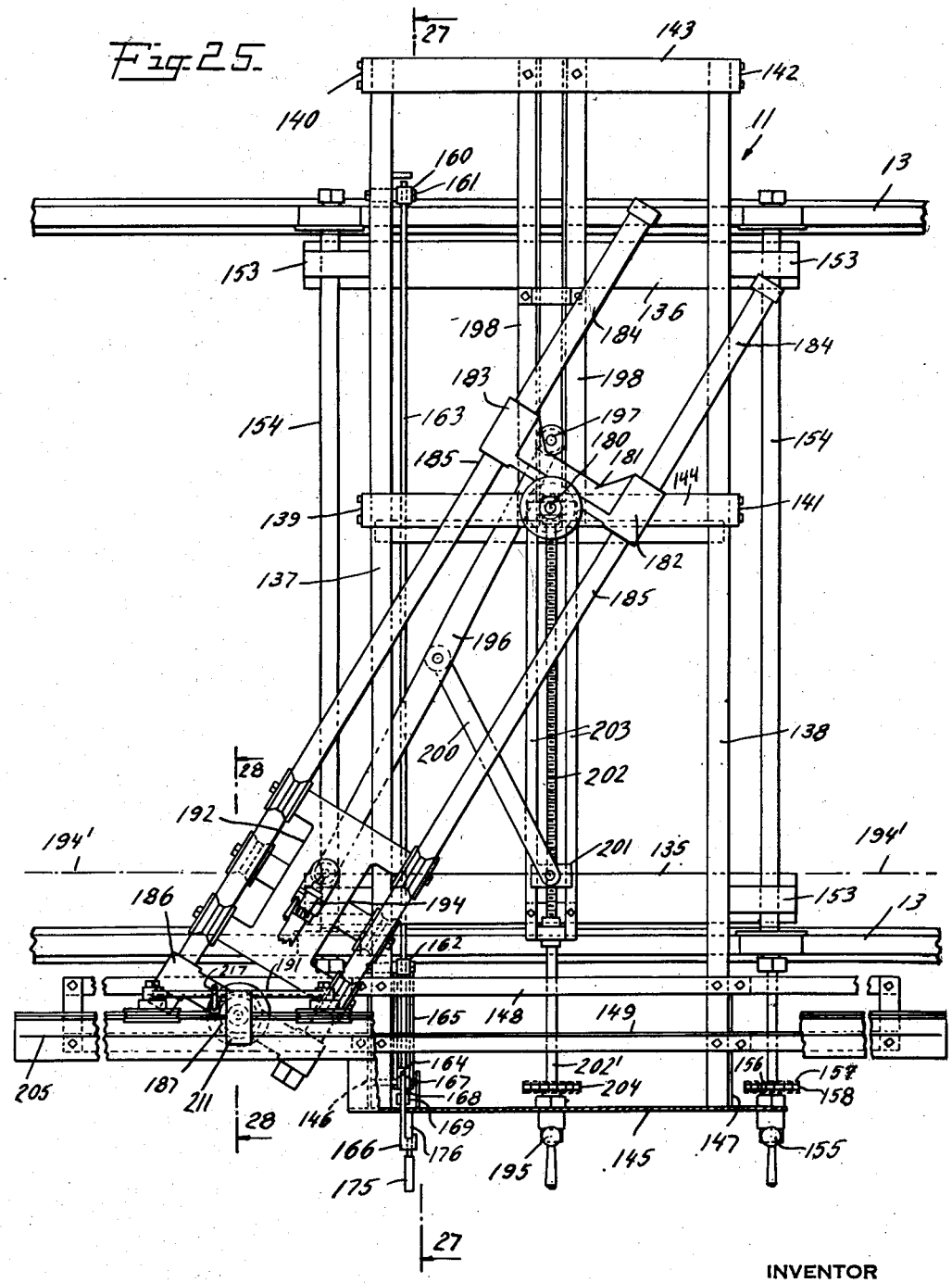

June 19, 1934.   O. TWEIT   1,963,537
PIPE CUTTING MACHINE
Filed Dec. 12, 1929    13 Sheets-Sheet 9
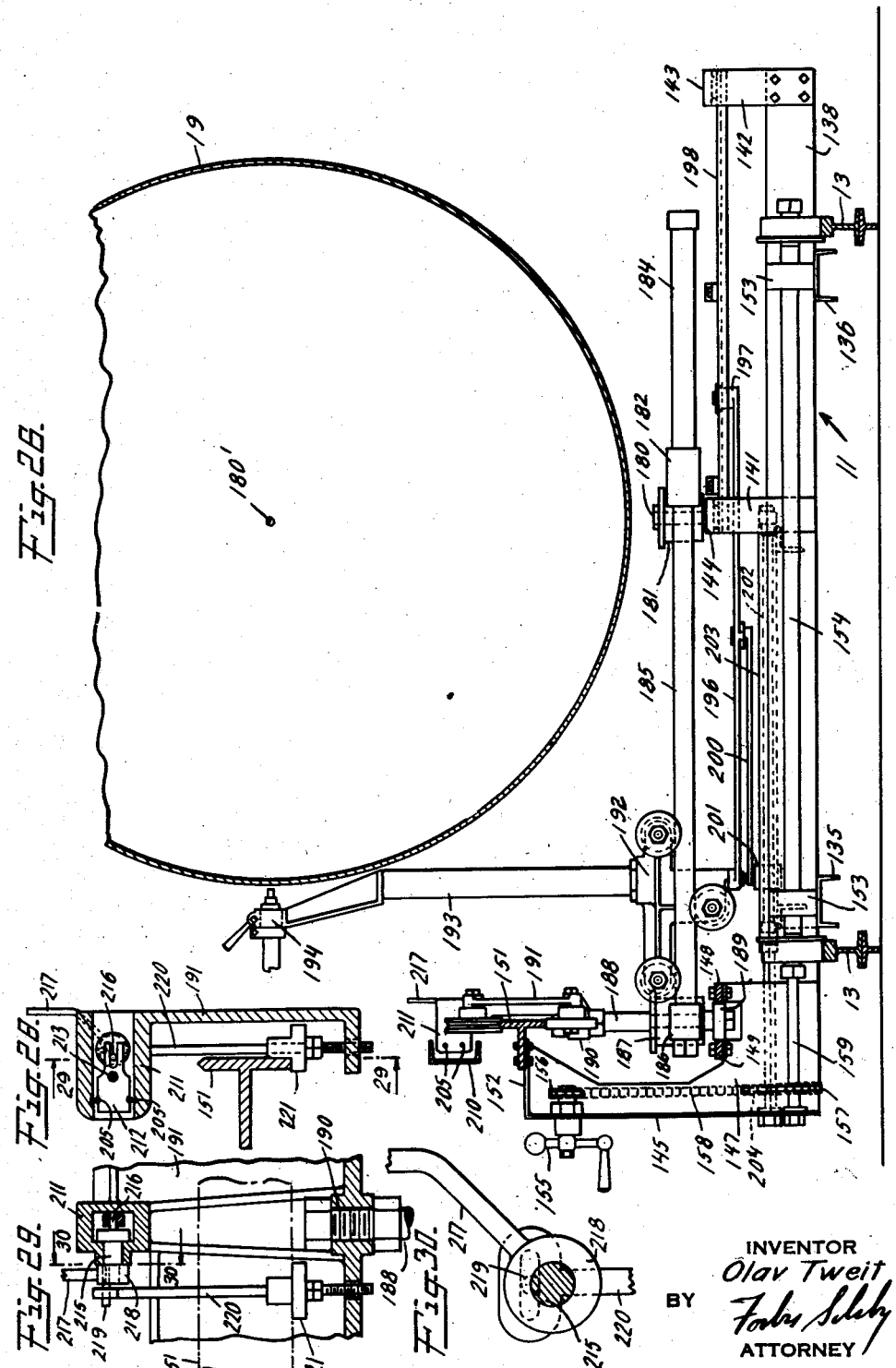
INVENTOR
Olav Tweit
BY
ATTORNEY

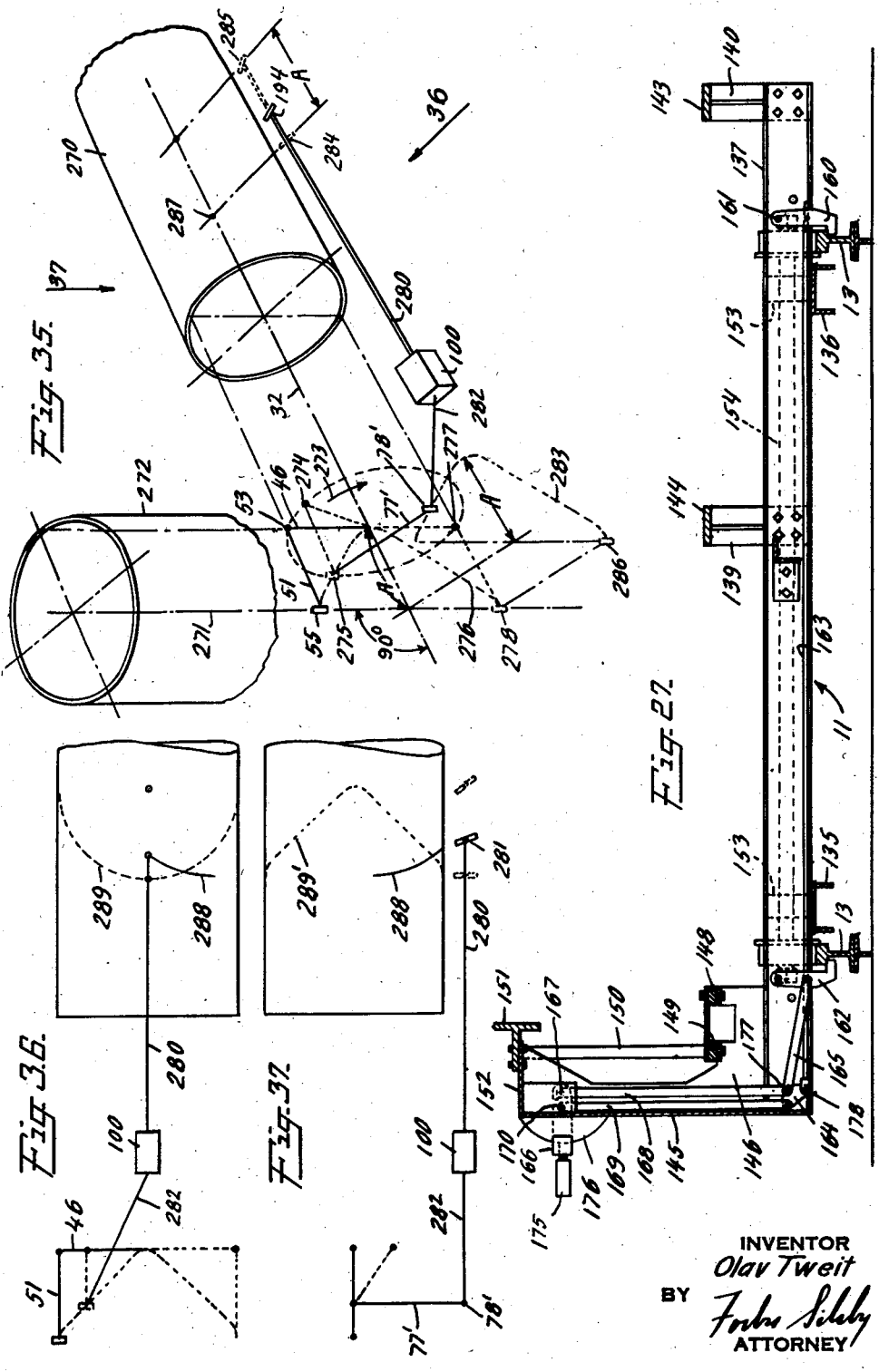

June 19, 1934.  O. TWEIT  1,963,537
PIPE CUTTING MACHINE
Filed Dec. 12, 1929   13 Sheets-Sheet 11
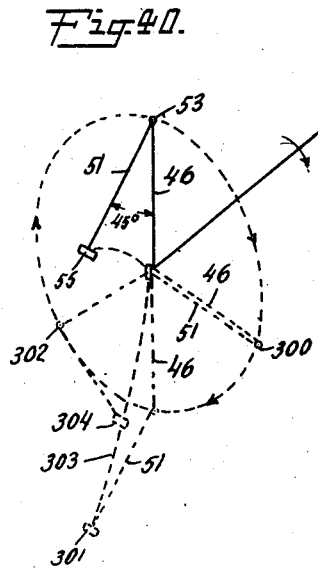
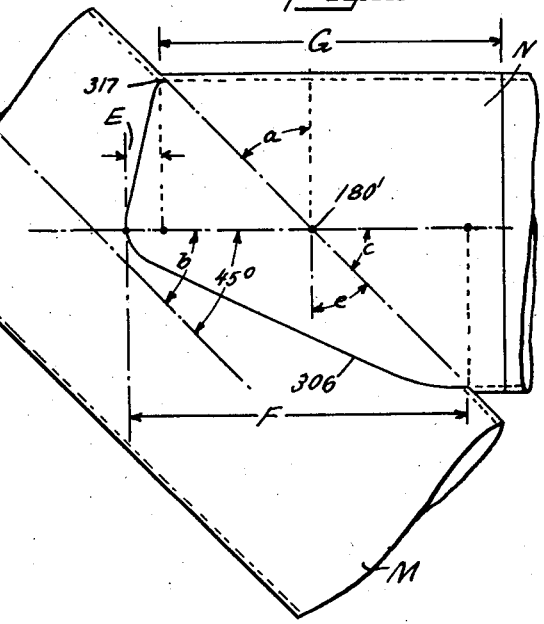
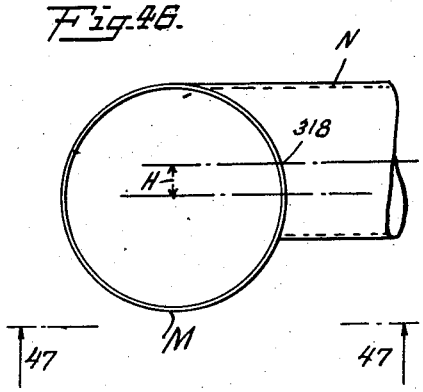
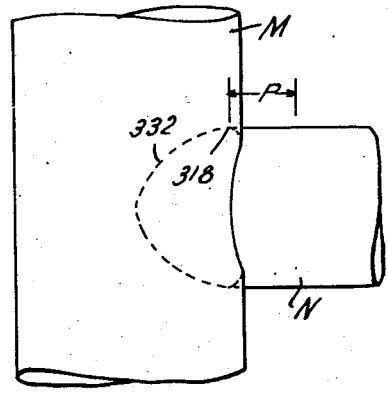
INVENTOR
Olav Tweit
BY
ATTORNEY

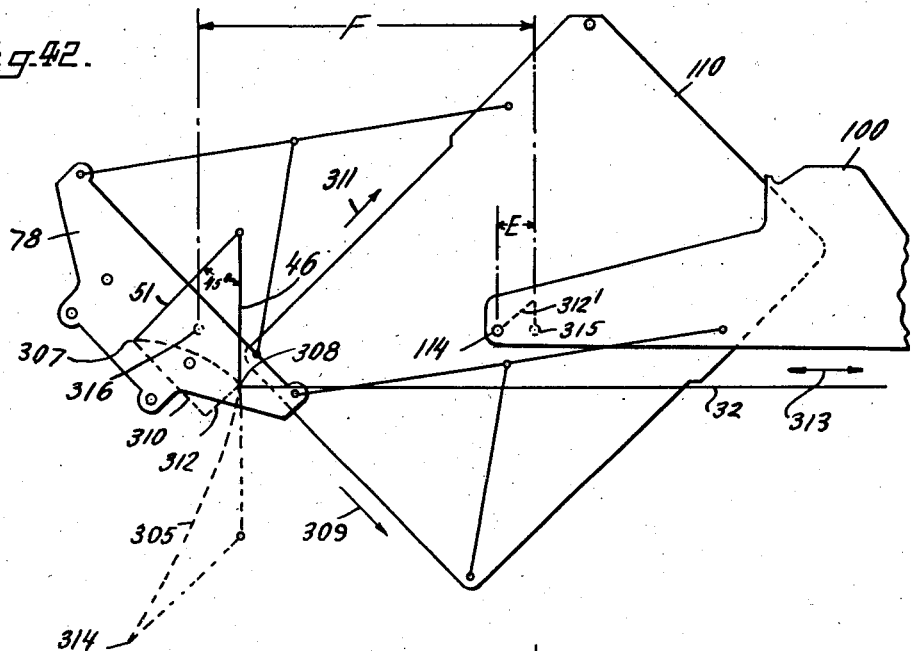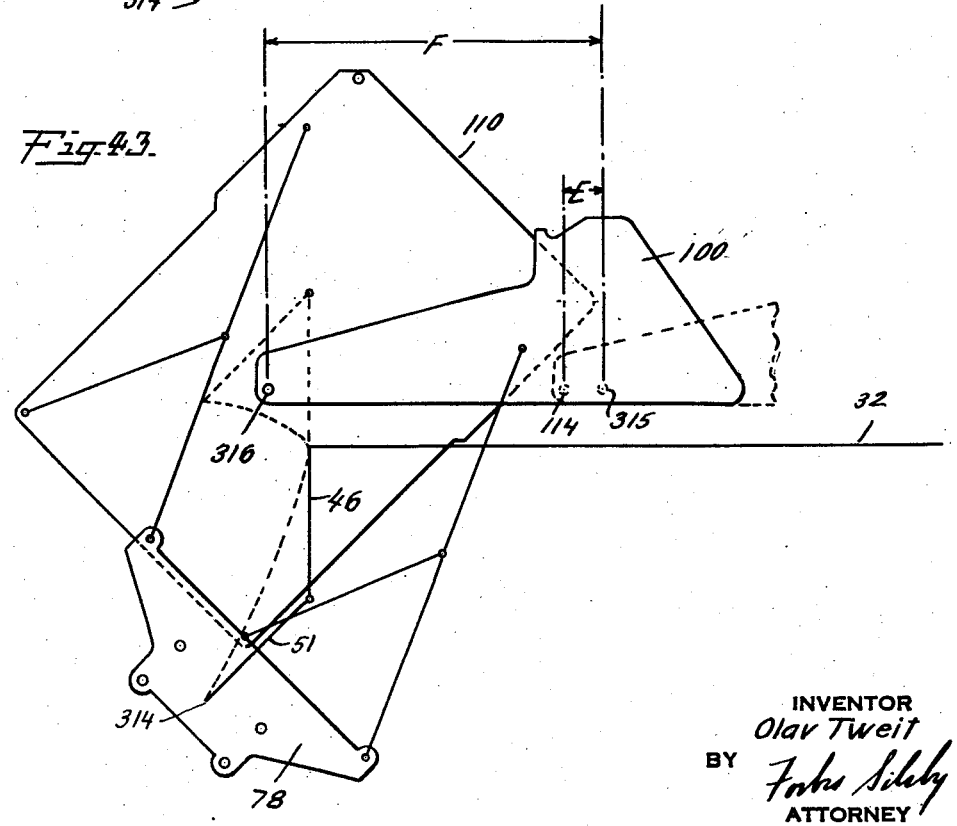

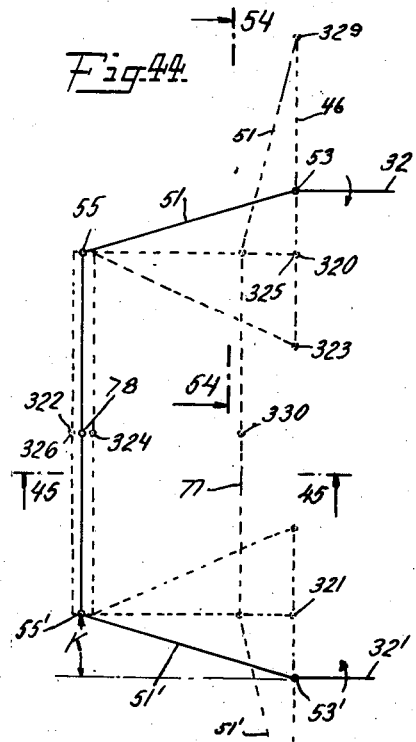
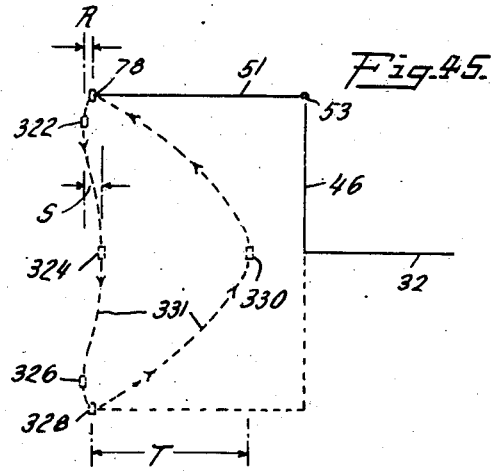
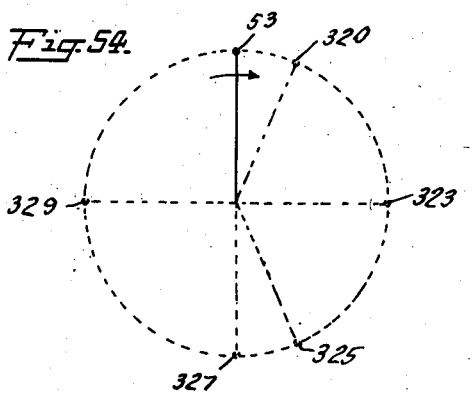
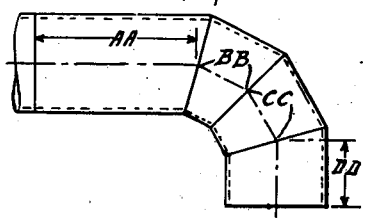
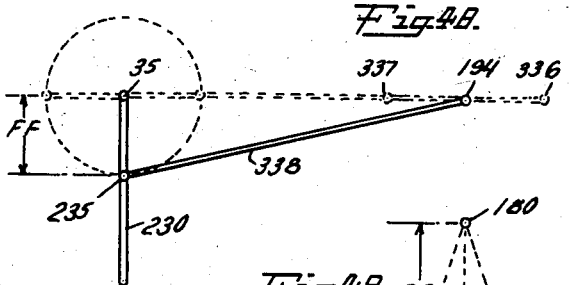
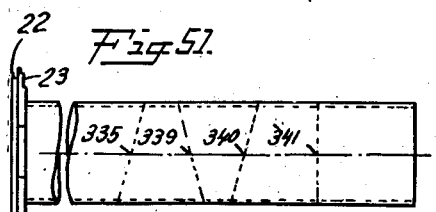
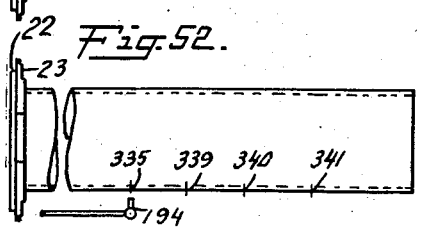
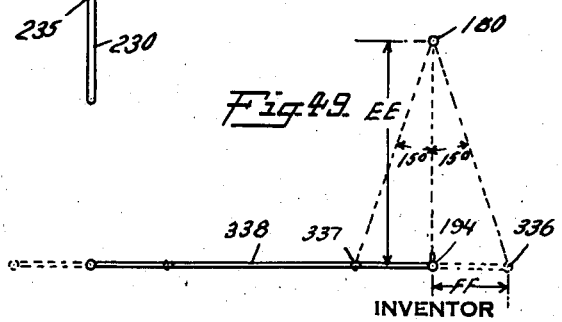

Patented June 19, 1934

1,963,537

UNITED STATES PATENT OFFICE 1,963,537

PIPE CUTTING MACHINE

Olav Tweit, Orange, N. J., assignor to Semet-Solvay Engineering Corporation, New York, N. Y., a corporation of New York Application December 12, 1929, Serial No. 413,633

48 Claims. (Cl. 266—23)

This invention relates to cutting machines generally, and more particularly to a machine for cutting pipes of relatively large diameters, such as those used in gas plants.

It is one of the primary objects of the invention to provide a cutting machine which will automatically develop and cut the ends of pipes, herein termed nozzles, to fit the outer surface of a pipe, called the main, when two such pipes are to be connected to each other to form T's and branches in a fluid circulation system. It is a further object of the invention to provide a machine which will develop and cut the desired intersection on the end of a nozzle irrespective of the diameters of the intersecting pipes, the thickness of the walls of the pipes, the angle of intersection of the pipes and whether the axes of the pipes do or do not intersect. It is a further object of the invention to provide a machine which will develop and cut accurately the line of intersection between the outer surface of a main pipe and inner surface of a nozzle, and at the same time bevel the intersecting end of the wall of the nozzle in such a manner that, regardless of the thickness of the nozzle wall, there is a substantially accurate fit between all parts of the cut end wall of the nozzle and the outside surface of the main pipe. It is a further object of the invention to provide a machine by means of which the end of a pipe may be cut in such a manner that the line of the cut lies in more than one plane.

The invention is further applicable to the cutting of pipes to form elbows and similar fittings. It is, therefore, a further object of the invention to provide a machine by which a pipe may be cut at any desired angle so that the line of the cut lies in a single plane disposed at any desired angle with respect to the axis of the pipe.

Other objects and features of novelty will be apparent from the following description when considered in connection with the accompanying drawings in which:

Fig. 1 is a side elevation of the assembled machine;

Fig. 2 is an elevation of the face plate of the tailstock taken on the line 2—2 of Fig. 1;

Fig. 3 is a plan view of the assembled machine;

Fig. 4 is a vertical section on the line 4—4 of Fig. 3;

Fig. 5 is an enlarged vertical section on the line 5—5 of Fig. 4;

Fig. 6 is an enlarged vertical section on the line 6—6 of Fig. 4;

Fig. 7 is an elevation on a reduced scale of the headstock taken approximately on the line 7—7 of Fig. 4;

Fig. 8 is a plan view of the head mechanism with certain parts omitted;

Fig. 9 is a vertical section on the line 9—9 of Fig. 8;

Fig. 10 is an elevation of a portion of the head mechanism taken approximately on the line 10—10 of Fig. 8;

Fig. 11 is a vertical section on the line 11—11 of Fig. 8, and shows in addition, a portion of the head mechanism not shown in Fig. 8;

Fig. 12 is an enlarged horizontal section on the line 12—12 of Fig. 9;

Fig. 13 is an enlarged horizontal section on the line 13—13 of Fig. 9;

Fig. 14 is a vertical section on the line 14—14 of Fig. 13;

Fig. 15 is a vertical section through the longitudinal center of the head mechanism taken on the line 15—15 of Figs. 3 and 16;

Fig. 16 is an end elevation of a part of the head mechanism taken on the line 16—16 of Fig. 15;

Fig. 17 is a vertical section on the line 17—17 of Fig. 15;

Fig. 18 is a vertical section on the line 18—18 of Fig. 15;

Fig. 19 is a vertical section on the line 19—19 of Fig. 15;

Fig. 20 is a horizontal section on the line 20—20 of Fig. 15;

Fig. 21 is a vertical elevation of parts of the head mechanism taken approximately on the line 21—21 of Fig. 16, and shows in addition a rope drum not shown in Fig. 16;

Fig. 22 is an enlarged elevation of parts shown in Fig. 21 taken approximately on the line 22—22 of Fig. 21;

Figs. 23 and 24 are enlarged details of parts shown in Figs. 21 and 22;

Fig. 25 is a plan view of the tool carriage;

Fig. 26 is an end elevation of the tool carriage looking toward the head mechanism;

Fig. 27 is a vertical section through the tool carriage taken on the line 27—27 of Fig. 25;

Fig. 28 is a vertical section through a clamp carriage taken on the line 28—28 of Fig. 25;

Fig. 29 is a vertical section taken on the line 29—29 of Fig. 28;

Fig. 30 is an enlarged vertical section taken on the line 30—30 of Fig. 29;

Fig. 31 is a vertical elevation of two pipes of equal diameters, the axes of which intersect at 90°;

Fig. 32 is an elevation of two pipes of unequal diameters, the axes of which intersect at 45°;

Fig. 33 is a vertical section of intersecting pipes showing a defective fit between the end of an intersecting nozzle and the outer surface of an intersected main pipe when the cutting tool used for making the cut on the end of the nozzle is constantly disposed at a right angle with respect to the longitudinal axis of the nozzle;

Fig. 34 is a vertical section similar to Fig. 33, but shows a flush fit between the end of the nozzle and the outer surface of the main pipe when the end wall of the nozzle is beveled according to one feature of the present invention;

Fig. 35 is a perspective of two pipes of equal diameters, the axes of which intersect at 90°, and in addition shows diagrammatically, certain parts of the present machine;

Fig. 36 is an elevation of the parts shown in Fig. 35 looking in the direction of the arrow 36 of Fig. 35;

Fig. 37 is a plan view of the parts shown in Fig. 35 looking vertically downward in the direction of the arrow 37 of Fig. 35;

Fig. 38 is a diagrammatic perspective illustrating the operation of certain parts of the head mechanism;

Fig. 39 is a diagrammatic view showing one phase of the operation of an angle adjusting mechanism adjusted to cut a nozzle for a 90° intersection with a main pipe;

Fig. 40 is a diagrammatic perspective similar to Fig. 38 with some of the parts of Fig. 38 shown in different positions;

Fig. 41 is a vertical elevation of two pipes of equal diameters, the axes of which intersect at 45°;

Fig. 42 is a diagrammatic elevation of the angle adjusting mechanism adjusted to cut a nozzle for a 45° intersection with a main pipe;

Fig. 43 is a diagrammatic elevation similar to Fig. 42 showing the parts in different positions;

Fig. 44 is a diagramatic plan view of parts of the head mechanism adjusted to cut the end of a nozzle for an intersection where the axes of the nozzle and the main pipe do not intersect;

Fig. 45 is a vertical elevation on the line 45—45 of Fig. 44;

Fig. 46 is a plan view of two intersecting pipes, the axes of which do not intersect;

Fig. 47 is an elevation of Fig. 46 taken on the line 47—47 of Fig. 46;

Fig. 48 is a diagrammatic elevation of certain portions of the machine;

Fig. 49 is a plan view of the parts shown in Fig. 48;

Fig. 50 is an elevation of a pipe cut to form an elbow;

Fig. 51 is an elevation of the layout of the pipe shown in Fig. 50 as it lies in the machine before cutting;

Fig. 52 is a plan view of Fig. 51;

Fig. 53 is a diagrammatic plan view of the parts shown in Fig. 38 in another position;

Fig. 54 is an elevation on the line 54—54 of Fig. 44;

The present machine consists principally of a tailstock 10, a tool carriage 11, and a head mechanism indicated generally at 12.

The tailstock carriage is mounted on four flanged wheels which permit movement of the carriage along the bed rails 13. The face plate 14 of the tailstock is rotatably mounted on the end of the screw 15 supported in the bearings 16. The face plate is provided on one surface with a series of wedge-shaped ribs 17, which are adapted to engage the ends of pipes of varying diameters, and to tightly hold one end of a pipe in the machine when the face plate is moved toward the headstock by rotation of the hand wheel 18 keyed to the end of the screw 15. Suitable means, not shown, are provided for locking the tailstock carriage to the rails 13 in any desired position. The tailstock simply serves to rotatably support one end of a pipe 19.

The head mechanism is mounted on a cast iron block 20, Figs. 4 and 8, supported by the angle iron frame 21.

The circular face plate of the headstock 22, Fig. 4, is provided with a series of stepped jaws 23 which are movable toward and away from the center of the face plate by means of screws 24 threaded into the eyes of the bolts 25, the heads of which are set in recesses in the jaws 23. The jaws are slidably fastened to the face plate by bolts 26, the shanks of which pass through radial slots in the face plate. The pinions 28 on the ends of screws 24 mesh with the gear 29 keyed to the hand wheel 30. Gear 29 and hand wheel 30 are rotatable on sleeve 31. Adjustment of the jaws 23 is effected by rotation of the hand-wheel 30. The face plate is keyed to the sleeve 31 which is rotatably mounted on the end of shaft 32, but the sleeve 31 and the face plate may be locked to the shaft 32 in any circular position by means of the tailnut 33.

The main shaft 32 is rotatably supported on the block 20 by suitable bearings as shown in Fig. 4. The motive power of the head mechanism consists of a reversible motor 34, Fig. 8, which is connected to the cross shaft 35 through the worm gear speed reducer 36, pinion 37, idler 38, consisting of two pinions axially fixed to each other, and the gear 39 keyed to the cross shaft 35. The cross shaft 35 drives the main shaft 32 through the beveled gears 40. The ratio of reduction between the motor 34 and the gear 39 is adjustable by reversing the idler 38, the axis of which is a pin eccentrically mounted on the inner end of the stub shaft 41. By loosening a set screw holding shaft 41 in any fixed position, the eccentric pin may be adjusted between pinion 37 and gear 39, so that the larger gear of the idler 38 may mesh with pinion 37, and the smaller gear of 38 mesh with gear 39. For cutting small and medium size pipe, a smaller reduction is used by having the small gear of 38 mesh with gear 37. For larger size pipe the idler 38 is turned end for end on its axis.

Referring to Figs. 4 and 8, the crank arm 45 is keyed to the main shaft 32 near the left end. The arm 46 is rotatably mounted on the end of the shaft 32, but may be locked to the shaft 32 to rotate therewith by means of the crank arm 45 and the index pin 47. The stub shaft 48 having a clevised end 49 is rotatably mounted in a bearing 50 on the end of the arm 46. The arm 51 having a clevised end 52 is connected to the clevised end 49 of the stub shaft 48 in such a manner as to provide a universal joint designated as 53.

The crosshead 55 provided with the upwardly and downwardly extending arms 56 and 57 is slidably mounted on the arm 51, and may be locked in any desired position by the clamp 58 operated by the tailnut 59. The clamp 58 is a part of the casting which includes the crosshead 55 and the upwardly and downwardly extending arms 56 and 57.

The crosshead 55 may be shifted to any position on the arm 51 by first loosening the clamp 58, and then either pulling the crosshead by hand, or moving it by means of the crank 60, Fig. 8, fixed on the end of spindle 61. The mechanism for moving the crosshead on the arm 51 is more clearly shown in the enlarged details of Figs. 5 and 6. The horizontally disposed portion of the bearing 62 pivots on the upper end of the arm 56. The vertically extending portion of the member 62 affords a bearing 63 for the spindle 61. The beveled gear 64 is splined to the spindle 61 by the key 65 slidable in an elongated slot on the upper side of spindle 61. The upwardly projecting ends of key 65 retain the gear 64 against the end of the bearing 63. It will be seen that this arrangement is such as to permit axial movement of spindle 61 relative to bearing 63 and gear 64 for a purpose which will hereinafter appear. The gear 64 meshes with gear 66 which is connected to the gear 67 through the sleeve 68 rotatably mounted on the upper end of the arm 56. The gear 67 meshes with the gear 69 which is connected to the pinion 70 through the stub shaft 71. The pinion 70 meshes with the rack teeth 72 on the face of the arm 51. It will be apparent, therefore, that, when the clamp 58 has been released, the rotation of the spindle 61 will be communicated to the pinion 70 through the beveled gears 64, 66, sleeve 68, gears 67 and 69, and stub shaft 71.

A bearing 75 is rotatably mounted on the lower end of the downwardly extending arm 57. Bearings 62 and 75 are each provided with clamps 76 by means of which the four rods designated collectively as 77 may be clamped to the crosshead 55. Clamps 76 are opened and closed by means of the nuts and bolts shown in Fig. 4. The four rods 77 may be considered as a unit as they are all held in fixed relation to each other at the center by a coupling 78, Fig. 8.

The cross shaft 35 is supported by suitable bearings as shown in Fig. 9. The beveled gear 80 is keyed to the shaft 35, and meshes with the gear 81, Fig. 8, which is similarly keyed to the counter shaft 32'. The counter shaft 32' carries on its left end a fixed crank arm and a rotatable, vertical arm 46', Fig. 1, which are identical in construction with the arms 45 and 46 of Fig. 4. The horizontal arm 51', cross head 55' and associated parts including the connection between crosshead 55' and spindle 61, all as shown in Fig. 8, are also identical in construction with the corresponding parts shown and described in connection with Fig. 4.

The vertical arms 46 and 46' are of fixed lengths, but the effective lengths of the arms 51 and 51' are adjustable by moving the crossheads 55 and 55' by means of the crank 60 as described; that is, by operating the crank 60 the crossheads 55 and 55', Fig. 8, may be moved along arms 51 and 51' away from or toward the universal joints 53 and 53' connecting the horizontal arms 51 and 51' with vertical arms 46 and 46'. By loosening the nuts of clamps 76, the crossheads 55 and 55' may be shifted along rods 77 toward the coupling 78, carrying with them the horizontal arms 51 and 51'. When the crossheads have been moved toward the coupling 78, the arms 51 and 51', instead of being parallel as shown in Fig. 8, will point inwardly toward the longitudinal center of the head mechanism, and will occupy some such position as shown by the dotted lines 82, Fig. 8. The reason for the slidable connection between spindle 61 and bearing 63 and gear 64 will now be apparent. As the crossheads 55 and 55' are moved toward or away from the coupling 78, bearing 63 and gear 64 simply slide along spindle 61. The purpose of the adjustment just described will be explained hereinafter.

In this specification, "longitudinal" refers to a direction parallel with bed rails 13, and "transverse" refers to a direction at right angles to the bed rails.

The upright frame 90, Figs. 15 and 16, is bolted to and supported by the base block 20 at the points 91, 92, 93 and 94, Fig. 8. In Fig. 15, the coupling 78 is shown in the position it will occupy when the vertical arms 46 and 46', and the arms 51 and 51' are in the positions shown in Figs. 4 and 8. The weight of the coupling 78 and its associated parts is balanced in any position by the counterweight 95 adjustable along the lever 96 which is pivoted at 97 to the head of the frame 90, Figs. 15 and 16. The coupling 78 is connected to the outer end of the lever 96 through the link 98 pivoted to the coupling at 99.

The longitudinally reciprocating carriage indicated generally as 100 consists of two vertically disposed plates 101 and 102 held apart by the spacers 103. A side elevation of the vertical plate 102 is clearly shown in Fig. 15. The carriage 100 is supported at four points by a link arrangement consisting of four rods 104 each pivotally attached to a lower corner of the carriage, and each of which carries on its upper end a cross pin 105 which slides up and down in a channel 106. The connection between a lever 104 and the carriage 100 is illustrated in Fig. 19 which is a vertical section on the line 19—19 of Fig. 15. The upper ends of supporting links 107 are pivotally connected at 108 to the rods 104, and pivotally connected at their lower ends to the casting 20 as at 109. It will be apparent from this construction that the carriage 100 may move from left to right and vice versa, Fig. 15, in a horizontal straight line but in no other direction. In other words, the carriage 100 is so mounted as to permit reciprocation longitudinally of the machine.

The angle adjusting frame indicated generally at 110 also consists of two vertically disposed substantially rectangular frame members 111 and 112. The configuration of frame member 112 is clearly shown in Fig. 15. The frame members 111 and 112 are held in spaced relation by the spacers 113. The frame 110 is rotatably supported by the carriage 100 on the bolt 114. The angular relation between the frame 110 and the carriage 100 is determined by the screw 115 rotatably mounted in a sleeve 116 which is pivotally supported between the plates 101 and 102 of the carriage 100. The lower end of the screw 115 is threaded into a sleeve 116' which is pivotally supported between plates 111 and 112 of the frame 110. In Fig. 17 it will be seen that the spacer 113 is provided with two outwardly projecting extensions 117 which engage notches 118 formed on the upper edge of plates 101 and 102 of the carriage 100. The studs 117 and notches 118 thus provide stops which prevent clock-wise rotation of the frame 110 beyond the horizontal position shown in Fig. 15.

The coupling 78 is connected to the frame 110 by a system of levers similar to those supporting the carriage 100. The rods 120 are pivotally attached at their outer ends as at 121 to the coupling 78. The opposite ends of the rods 120 are provided with cross pins 122, which are slidably mounted in the channels formed by blocks 123 shown in section in Fig. 18. Four links 125 are pivotally connected at their outer ends with the vertical frame members 111 and 112 as indicated at 126. At their opposite ends, the links 125 are pivotally connected to the rods 120 at 127.

On account of this link connection between the coupling 78 and the frame 110, it will be seen that when the frame 110 is in the position shown in Fig. 15, the coupling 78 may move up and down without imparting any motion whatever to the frame 110. However, the horizontal component of any movement of the coupling 78 will be duplicated by the frame 110, and thus transmitted to the carriage 100 through the pivotal connection 114. Briefly, any horizontal motion of the coupling 78 is transmitted to the carriage 100, but vertical motion of the coupling 78 is absorbed by the links 120 and 125, and produces no movement in the carriage 100.

The angular relation between the carriage 100 and the frame 110 is determined by a graduated indicator designated generally at 130, Fig. 16. This indicator is more clearly shown in Figs. 21 to 24 inclusive. The member 131 having an arcuate shoulder 132 is riveted to the frame member 111 and rotates therewith about 114. The arc 133 is riveted to the carriage member 101. The arc 133 is graduated from 90° to 45° as shown in Fig. 24, and the arcuate shoulder 132 of member 131 is provided with an index mark 134. It will be apparent, therefore, that any angular relation from 90° to 45° may be established between frame 110 and the carriage 100 by manipulating the screw 115. The purpose of this adjustment will be explained hereinafter.

The construction of the tool carriage is illustrated chiefly in Figs. 25 to 30 inclusive. The supporting frame of the tool carriage consists of the longitudinal members 135 and 136, and the transverse vertically disposed channels 137 and 138. These frame members are bolted or screwed together in any suitable manner. The brackets 139 and 140 are attached to and project upwardly from the transverse channel 137, as indicated in Fig. 27. Two similarly disposed brackets 141 and 142 project upwardly from the transverse channel 138, and together with brackets 139 and 140, afford suitable support for the longitudinal members 143 and 144. A sheet steel control panel 145, appearing in elevation in Fig. 1, has welded thereto near its vertical edges, two sheet steel members 146 and 147. Fig. 27 shows an elevation of the member 146. Members 146 and 147 form in effect two inwardly projecting flanges which afford the main supporting means for the control panel 145. Members 146 and 147 are riveted or otherwise secured to the forward ends of the vertically disposed channels 137 and 138, respectively. As shown in Figs. 26 and 27, each of the members 146 and 147 is provided with upstanding projections supporting the spaced rails 148 and 149 extending the full length of the tool carriage as shown in Fig. 1. The vertical posts 150 are set into the extreme ends of the front rail 149, and support at their upper ends the T-rail 151 which also extends the full length of the tool carriage. As shown in Fig. 27, the upper edge of the control panel 145 is bent at a right angle to form the horizontally extending flange 152, which is riveted or otherwise fastened to the horizontal flange of the T-rail 151.

The rectangular blocks 153 rest on and are attached to the longitudinal channels 135 and 136, and thus provide bearings for the axles 154 to which are keyed the flanged wheels engaging the bed rails 13. The carriage is moved back and forth on the rails by means of the hand crank 155, the axis of which is rotatably mounted in the control panel 145, and carries on its inner end sprocket 156 operatively connected with the sprocket 157 by means of the chain 158. The sprocket 157 is keyed to the stub shaft 159 which is an extension of one axle 154.

The tool carriage may be locked to the bed rails by means of the lever arrangement shown in Fig. 27. The hook 160 is pivoted on the channel 137 at 161. Hook 162 is similarly pivoted on the channel 137. The rod 163 is pivotally attached at one end to hook 160, and pivoted at its other end to the triangular floating member 164. Rod 165 is pivoted at one end to the hook 162, and at the other end to the triangular member 164. The operating handle 166 rotates about the bolt 167 which is suitably supported by the sheet steel member 146. The rod 168 is pivoted at its upper end on the bolt 167, and at its lower end to the triangular member 164. The upper end of rod 169 is pivotally attached to the operating handle 166 at 170, and at its lower end to the member 164. In the position of the parts as shown in Fig. 27, the carriage is unlocked; that is, it may be moved back and forth freely on the bed rails. To lock the carriage it is only necessary to pull the operating handle upwardly, and tighten down on the screw 175 which engages the edge of the arc 176, thus holding the handle 166 in any desired position. When handle 166 is raised, rod 169 is lifted, and for a short interval of time the triangular member 164 rotates clock-wise about the point 177. This movement pulls the rod 163 to the left, and engages the hook 160 on the under side of the adjacent rail. When this movement is substantially complete, point 178 becomes the center of rotation of triangular member 164, and further upward movement of the rod 169 serves to thrust the point 177 and the connected rod 165 to the right, forcing the hook 162 under the bed rail, and thus securely locking the carriage to the rails.

The vertical stub shaft 180 is fixed to and projects upwardly from the cross member 144. The casting 181 is rotatably mounted on and supported by the post 180. The casting 181 is provided with two oppositely disposed sleeves 182 and 183 which are threaded on their rear ends to receive the hollow tubes 184. The rails 185 are rigidly secured together at their forward ends by the casting 186, and are supported at their inner ends by the sleeves 182 and 183, and the tubes 184. On any movement of the rails as a unit toward or away from the post 180, the inner ends of the rails 185 slide back and forth in the tubes 184.

The casting 186 is provided at its center with a bearing 187 which pivots on and is supported by the vertical post 188. A roller 189, disposed between rails 148 and 149, is pivotally mounted on the lower end of post 188, while the upper end of post 188 is threaded into or otherwise rigidly secured, as indicated at 190, to the clamp carriage 191.

The cutting tool holder carriage 192 is provided with six wheels, four of which engage the upper side of rails 185, and two of which engage the under side of the said rails. The tool post 193 projects vertically from the carriage 192, and supports on its upper end a suitable cutting tool holder 194. In the preferred form of the invention, the cutting tool is an acetylene torch, but the cutting tool may be a suitable operated milling cutter, or emery wheel. The position of the tool holder carriage 192 on the rails 185 is controlled by levers adjusted by the hand crank 195. The rod 196 is at one end pivotally attached to the carriage 192, and at its opposite end is provided with a cross pin 197 which moves back and forth between the spaced rails 198. Link 200 is pivoted at one end to the approximate midpoint of the rod 196, and at its opposite end, it is pivotally secured to the nut 201 which is threaded onto the screw 202 and arranged to slide back and forth between the spaced rails 203. The screw 202 carries an extension 202' to the end of which is fixed a sprocket 204. The sprocket 204 is operated by the hand crank 195 through a sprocket and chain arrangement similar to that shown in Fig. 26 for the operation of the stub shaft 159.

The clamp carriage 191 is provided with four wheels, two of which engage the upper edge and two the lower edge of the T-rail 151. Carriage 191 is adapted to move over substantially the entire length of the T-rail 151 as shown in Fig. 1. The carriage 191 through the vertical post 188 and the bearing 187 supports the rails 185, and the tool holder carriage mounted thereon. It is evident, therefore, that as the carriage 191 is moved along the T-rail 151, the tool holder carriage 192 and the tool holder 194 make a corresponding reciprocating movement on account of the described connection between the rails 185 and the carriage 191.

The distance between the tip of the tool holder 194 and the longitudinal axis of a pipe in the machine, and the extent of the reciprocating movement of the tool holder are controlled by the position of the sliding nut 201 which is in turn adjusted by the hand crank 195.

For any adjustment of the sliding nut 201, the nut, the post 193, and the tool holder 194 are always in the same vertical line when the clamp carriage 191 is at the midpoint of T-rail 151. For any other position of carriage 191 on T-rail 151, the holder 194 is always distanced from the longitudinal center of the pipe in the machine an amount equal to the distance between the nut 201 and the center post 180 which is, of course, directly underneath the longitudinal axis of the pipe. That is, as the carriage 191 moves back and forth along the T-rail, the tool holder 194 moves back and forth in a straight horizontal line parallel to the pipe, and lying in a vertical plane which includes the sliding nut 201. In other words, for any adjustment whatever of the nut 201, or whatever the position of carriage 191 on T-rail 151 may be, a longitudinal vertical plane passing through nut 201, and represented in Fig. 25 by the dotted line 194', always includes the tip of the tool holder 194. This relation between the nut 201 and the tool holder 194 is maintained by the link connection including rods 196 and 200 between the nut 201 and the tool holder carriage 192. It will be apparent that the extent of the reciprocating movement of the tool holder depends upon the position of the sliding nut 201, and the greater the distance between the nut 201 and the post 180, the greater will be the movement of the tool holder.

It will be observed from an inspection of Figs. 25 and 26 that the tip of the tool holder 194, regardless of the position of the clamp carriage 191 on rail 151, always points toward the intersection of the longitudinal axis of the pipe in the machine, and a line extending vertically through the post 180. The purpose of this feature of the invention is to bevel the end of the cut on the intersecting nozzle so as to effect a flush fit between the end of the nozzle and the outer surface of the intersected main pipe. The advantage of this arrangement will be appreciated from a consideration of Figs. 33 and 34. If the cutting tool while moving parallel to the pipe being cut, always points at a right angle toward the longitudinal axis of the pipe, the end wall of the cut would be perpendicular to the axis of the pipe, and would result in an imperfect fit as shown in Fig. 33. On the other hand, if the tip of the cutting tool is always directed as described, i. e., toward the intersection of the axis of the pipe and the vertical line including the post 180, the end of the cut will be beveled, thus effecting a substantially perfect fit between the end of the nozzle N and the main M as shown in Fig. 34. In Fig. 34 and also in Figs. 26 and 41, the point indicated at 180' denotes the point toward which the tool holder is always directed when a nozzle N is being cut in the machine. The bevel thus produced is not perfect for all points on the circumference of the cut, but is so nearly so, that small irregularities are obliterated when the main and the nozzle are subsequently welded.

The clamp carriage 191 is operated by a cable 205, Fig. 1. One end of the cable 205 is attached to and wrapped a number of turns around the rope drum 206. The cable then passes under pulley 207, under pulley 208, at the opposite end of the machine, around pulley 209, and then back to the rope drum 206, around which the other end of the cable is wound several times and then fastened. Cable 205 moves back and forth behind the guard channel 210 in accordance with the motion imparted to the rope drum 206 by the reciprocating carriage 100.

The carriage 191 is clamped to the cable 205 as required by means of the clamping mechanism shown in Figs. 28, 29 and 30. The extension 211 of carriage 191 is provided with openings which permit the upper and lower strands of the cable, shown in section in Fig. 28, to pass through member 211. The clamping member 212 is pivoted to the extension 211 on a pin 213. When the clamping member is in the neutral position as shown in Fig. 28, it engages neither the upper nor lower strand of the cable. Consequently, with clamping member 212 so disposed, movement of the cable is not transmitted to the carriage 191.

As shown in Fig. 29, the extension 211 provides a bearing for the short stub shaft 215. A crank pin 216 is set into the disc-like member on the inner end of the stub shaft 215, and is located a short distance horizontally to the left of the axis of the stub shaft when the latter is in the position shown in Fig. 28. The pin 216 lies within the forked end of the clamping member 212. The operating handle 217 carries on its lower end an eye 218, drilled to fit over the left end of the stub shaft 215 as in Fig. 29. A second offset crank pin 219 keys the operating handle 217 to the shaft 215. The pin 219 projects beyond the end of the shaft 215, and passes through a horizontally elongated slot formed on the head of the rod 220. In the position of the parts shown in Figs. 28 and 29, pin 219 is vertically over the axis of the stub shaft 215. A brake shoe 221 is fitted over the lower end of the rod 220, and is adapted to engage the lower edge of the T-rail 151 to lock the carriage 191 thereto.

The operation of the cable clamp is as follows. As shown in Figs. 28 and 29, all the parts are disposed in a neutral position, that is, both upper and lower strands of the cable 205 are permitted to slide freely through the extension 211 without transmitting movement to the carriage 191. The eccentric pin 219 is in its highest position, and has lifted the rod 220 sufficiently to engage the brake shoe 221 with the under edge of the rail 151. Hence, the carriage 191 is locked to the rail 151. When the handle 217 is rotated clockwise, Fig. 28, shaft 215 is rotated clockwise. The rotation of the stub shaft 215 raises the offset crank pin 216 which in turn raises the forked end of clamp 212 and lowers the clamping end, thereby securely clamping the lower strand of the cable between the lower side of the clamping member 212 and the body of the extension 211. At the same time the rotation of the stub shaft 215 lowers the crank pin 219, from its uppermost position, thus permitting the rod 220 to drop sufficiently to release the brake shoe from the rail 151. When the operating handle 217 is moved counter clockwise from the vertical position, the crank pin 216 drops downwardly and raises the outer end of the clamp 212 into contact with the upper strand of the cable, thus locking the carriage 191 thereto. During the same movement the crank pin 219 is again lowered, this time to the left, Fig. 28, releasing the brake 221. Consequently, when the operating handle is in a vertical position, carriage 191 is disengaged from the cable 205, and locked to the rail 151; when the operating handle is moved to the right, the carriage 191 is unlocked from the rail 151, and clamped to the lower strand of the cable; when the handle 217 is moved to the left, the carriage 191 is also disengaged from the rail 151, and locked to the upper strand of the cable.

The cable drum 206 and associated parts are shown in Fig. 11. The drum is keyed to the shaft 224 which is supported in suitable bearings in the cast iron bed frame. The disc 225 is keyed to the shaft 224, and carries an index pin 226. The pulley 227 is rotatably mounted on the inner end of the shaft 224, but may be keyed thereto by means of the index pin 226 and disc 225. A cable 228, Fig. 21, is wrapped several times around the pulley 227, and the ends thereof fixed to the vertical plate 101 of the carriage 100. The diameter of the pulley 227 is to the diameter of the rope drum 206 as 11¾ is to 42. The reason for this particular ratio will appear hereinafter. It will be noted that when the index pin 226 locks together the disc 225 and the pulley 227, the motion of the carriage 100 will be transmitted to the rope drum 206 through cable 228, pulley 227 and shaft 224.

That portion of the machine which has been described is used for cutting connections such as shown in Figs. 31, 32, 41 and 46. That portion of the machine which is now to be described is used for cutting elbows such as shown in Fig. 50.

Referring to Figs. 8, 9, 10, 12, 13 and 14, the arm 230 is rotatably mounted on the end of the cross shaft 35. The disc 231 is keyed to the shaft 35, and the arm 230 may be connected therewith by the index pin 232, so that the arm 230 will rotate with shaft 35. A threaded bolt 233, Fig. 9, extends the length of the arm 230, and may be rotated therein by means of the knob 234 on its upper end. A sliding nut 235, Fig. 12, is threaded on the bolt 233, and carries an outwardly projecting shank 236, on which is rotatably mounted a roller 237. The shank 236 projects forwardly through the vertical slot 238 cut in the vertical carriage 239. The carriage 239 is provided with four rollers 240 which engage the upper and lower edge of the rail 241, the longitudinal extent of which is shown in Fig. 1. The rail 241 is riveted to the forward face of the guard channel 210, and both rail 241 and channel 210 are slotted longitudinally as at 242 to permit the passage therethrough of the shank of a clamping device designated generally as 243, which serves to clamp the carriage 239 to the lower strand of the cable 205.

The clamp 243 is shown in elevation in Fig. 9, and in detail in Figs. 13 and 14. The block 244 is welded or otherwise secured to the inner surface of the carriage 239, and is horizontally slotted at its inner end as shown in Fig. 14. The block 244 is also drilled to permit insertion of the bolt 245, and to form a seat for a coiled spring. The bolt 245 is threaded on its outer end to receive the tailnut 246. A forked member 247 is rigidly fastened to the inner end of the bolt 245. The end of the forked member 247 is closed by the small rectangular plate 248. Thus, when the tailnut 246 has been loosened sufficiently to permit the spring to move the forked block 247, Fig. 14, to the left, the passage 249 between the inner vertical edge of plate 248 and the vertical edge 250 of the horizontal slot is wide enough to permit the cable 205 to pass freely through the clamp 243. However, when the tailnut 246 is tightened down, the lower strand of the cable 205 is firmly wedged between the inner vertical edge of the plate 248 and the vertical surface 250 of the horizontal slot. Thus, by suitable operation of the tailnut 246, the carriage 239 may be locked to or disengaged from the cable 205.

When it is desired to operate this portion of the machine to cut elbows in a manner which will be hereinafter explained in detail, the index pins 47 and 47' are pulled out and given a half turn to disconnect vertical arms 46 and 46' from the main shaft 32 and the counter shaft 32', respectively. Index pin 226 is also pulled out and given a half turn, thereby disconnecting the carriage 100 and the rope drum 206. The arm 230, Fig. 9, is then connected to the cross shaft 35 by engaging the index pin 232 and the disc 231. When the cross shaft 35 is rotated by the motor, the arm 230 rotates therewith, and the rotary motion of the arm 230 is transformed into linear motion of the carriage 239 on account of the movement of the roller 237 in the vertical slot 238 of the carriage 239. During each revolution of the cross shaft 35, the carriage 239 will move on the rail 241 through a total horizontal distance equal to four times the effective length of the arm 230, which is the distance between the axis of the shaft 35 and the axis of the roller 237. This length may be changed, for purposes hereinafter described, by adjusting the position of the sliding nut 235 on the screw 233 by rotating the knob 234. When cutting elbows, the carriage 239 is locked to the lower strand of the cable 205 by means of the clamp 243, thus transmitting to the cable the linear motion of the carriage 239.

Before describing the operation of the machine in detail, the basic principles on which the operation depends will be first explained.

The present machine is designed to automatically develop and cut the end of a nozzle so as to fit a main pipe of any relatively large diameter, irrespective of the diameter of the nozzle, or the angle of intersection between the main and the nozzle or whether the axes of the pipes intersect.

The principles upon which the invention is based may be most readily understood if considered in connection with Fig. 31 representing a main pipe 255 and a nozzle 256 of equal outside and inside diameters, and the axes of which intersect at a right angle. The intersection of two cylindrical bodies is a line formed by the intersection of the radii of the two bodies. When two pipes intersect, as in Fig. 31, there are two lines of intersection, i. e., the intersection of the outside surface of the main and the inside of the nozzle, and the outside of the main and the outside of the nozzle. However, we are only interested here in the intersection of the outside surface of the main and the inner surface of the nozzle. If the intersection of the latter two surfaces is accurately determined, and the nozzle cut according to this invention, the intersection of the outer surfaces of the main and the nozzle will take care of itself.

In Fig. 31 the solid line 257 represents the intersection of the outside surface of the main 255 and the inside surface of the nozzle 256. Assume that the axes 258 and 259 represent shafts on which the sleeves 260 and 261 are free to slide and rotate without friction. The arm 262 is rigidly connected to the sleeve 260, and is of a length equal to the inside diameter of the nozzle 256. The arm 263 is similarly attached to the sleeve 261, and is of a length equal to the outside diameter of the main 255. If the arms 262 and 263 are fastened together at their ends by a universal joint, represented at 264, it will be seen that if the arm 262 is rotated 360° about axis 258, and the sleeves 260 and 261 are free to move along the axes 258 and 259, the universal joint 264 will describe in space the intersection represented by the solid line 257. After the arm 262 has been rotated 90° up out of the plane of the drawing, sleeve 261 will have moved down along axis 259 to the axis 258, sleeve 260 will have moved to the left along axis 258 as far as the axis 259, and arms 262 and 263 will be vertical with respect to the plane of the drawing and will theoretically coincide. As the rotation of the arm 262 continues to 180°, sleeve 260 will move back to its initial position, and sleeve 261 will move downwardly to the lowermost position shown in the dotted lines, and arms 262 and 263 will again lie in the plane of the drawing. The sleeves, the arms and the universal joint are also shown in dotted lines in an intermediate position about half way between 90° and 180°. As the rotation of arm 262 about axis 258 continues beyond 180°, sleeves 260 and 261 retrace their paths, and after arm 262 has made one complete revolution, the sleeves, arms and universal joint 264 are again in their original position shown in the solid lines.

The same principles apply to all intersections no matter what the diameters of the pipes or the angle of their intersection may be. This is illustrated in Fig. 32 which represents an elevation of two pipes of unequal diameters, the axes of which intersect at an angle of 45°. The intersection of the pipes is shown by the solid line 265. The sleeves, the arms and the connecting universal joint are represented in one position in solid lines and in another position in the dotted lines. It will be observed that the only difference between the arrangement of the parts in Fig. 32 and in Fig. 31 is that the lengths of the arms 266 and 267, and the angle between them have been adjusted in accordance with the diameters of the intersecting pipes and the angle of intersection. In Fig. 31 the initial angle between arms 262 and 263 is 90° because the angle of intersection of the pipes is 90°. In Fig. 32 the initial angle between the arms 266 and 267 is 45° because the angle of intersection is 45°.

The application of these principles to the present machine will now be described in connection with Fig. 35 which represents, in perspective, two pipes of equal inside and outside diameters, the axes of which intersect at a right angle. Certain parts of the present machine also appear in this view diagrammatically, and bear the same reference characters as applied in other parts of this specification.

The shaft 32 coincides with the axis of the pipe 270. It should be understood that the pipe 270 and the shaft 32 are so connected as to rotate together when power is applied to shaft 32. The axis 271 of the pipe 272 is vertical, and intersects the axis of the pipe 270 at a right angle, that is, the axis 271, and the axis of pipe 270 lie in the same vertical plane, and intersect each other at 90°. The arm 46 is initially vertically disposed, and is fixed to shaft 32 to rotate therewith. The length of the arm 46 is equal to the inside radius of pipe 270. The arm 51 is horizontal and is connected at one end to the vertical arm 46 by the universal joint 53, and at its opposite end to the crosshead 55. The length of the arm 51 equals the outside radius of pipe 272. For the purpose of the explanation in connection with Fig. 35, it should be considered that the crosshead 55 is constrained by mechanical means, not shown in this figure, so that it may move only in a vertical plane which includes vertical axis 271, and the horizontal axis of pipe 270 and the coinciding shaft 32. The mechanical means for confining the movement of crosshead 55 to this particular vertical plane will be explained subsequently.

At the beginning of the operation of cutting a nozzle from pipe 270 to fit pipe 272, the arms 46 and 51, the universal joint 53 and the crosshead 55 are in the position shown in the solid lines. When the shaft 32 and the attached pipe 270 are rotated in the direction of the arrow 273, say approximately 30°, the universal joint 53 will be in the position 274, and the arms 46 and 51 will be in the position shown in the dotted lines converging at 274. It will be remembered that the crosshead 55 can move only in a vertical plane which includes the shaft 32 and the axis 271. For this reason the crosshead 55 will be in the position 275. When the pipe 270 has been rotated 90°, the crosshead 55 will have moved down over the path represented by the dotted line 276 to a point where it lies in the axis of the shaft 32. As the rotation of the pipe and shaft 32 continues to 180°, the universal joint 53 will move around to the position shown at 277, and the crosshead 55 will be at 278; that is, during the period in which pipe 270 revolves through the first 180°, the crosshead 55 has followed the path of the bent dotted line 276 from its original position down to the position indicated at 278. On continued rotation of the pipe 270 and shaft 32, the crosshead 55 retraces its path and, after a rotation of the shaft through 270°, lies again in the axis of the shaft 32. As the shaft 32 rotates between 270° and 360°, the crosshead 55 continues its return movement over the dotted line 276, again passing through the position 275 until, when the shaft 32 has made one complete revolution, the crosshead will have returned to its original position. It will be appreciated that the crosshead 55 will follow the path described, when it is considered that the lengths of the arms 46 and 51 remain constant, and that the crosshead is mechanically constrained so that its movements are confined to one vertical plane which includes the shaft 32 and the axis 271.

It will also be noted that the path described by the crosshead 55 is identical in form with the vertical projection of the intersection of the two pipes. This similarity is clearly shown in Fig. 31 wherein the dotted line 276 is reproduced. It will be seen that the solid line 257, which represents the vertical projection of the intersection of the outside of the main 255 and the inside of the nozzle 256, is identical in form with the dotted line 276 which represents the path of the crosshead 55 in Fig. 35. The only difference in these lines is that they are reversed with respect to each other.

Turning again to Fig. 35, and bearing in mind the movement of the crosshead 55, let it be considered that the solid line 77' represents an arm rigidly attached to the crosshead 55, and consequently moving in accordance therewith. The arm 77' is substantially a duplicate of the four rods 77 appearing in Fig. 8. The coupling 78 of Figs. 8 and 15 is represented in Fig. 35 as 78'. The horizontally reciprocating carriage 100 of Figs. 15 and 16 appears diagrammatically in Fig. 35. The carriage 100 has attached thereto an arm 280. By means not shown in Fig. 35, the carriage 100 and the attached rod 280 can move only back and forth in a horizontal line which includes the axis of the rod 280. The rod 280 carries on its end the tool holder 194, which in this instance may be assumed to support a cutting torch. The carriage 100 and the coupling 78' are connected by a rod 282 which is pivotally connected to both carriage 100 and the coupling 78'.

For the sake of simplicity, the carriage 100, coupling 78' and the rod 77' are shown only in a single intermediate position. However, on account of the connecting rod 77', it will be evident that the coupling 78' moves over a path represented by the dotted line 283 which is identical in form with the dotted line 276, over which the crosshead 55 moves. Therefore, at the beginning of rotation of pipe 270, the torch in the holder 194 is in the position shown in the dotted lines at 284. When the pipe 270 has been rotated from its initial position, through say 30°, so that the universal joint 53 is in the position 274, and the crosshead 55 is in the position 275, the rod 77', coupling 78', carriage 100 and the torch holder 194 will be in the position shown in full lines. When the pipe 270 has rotated 90°, the crosshead 55 will have moved horizontally in a vertical plane including shaft 32 and the vertical axis 271, an amount equal to the distance A, which distance, it will be noted, equals the outside radius of main pipe 272. The coupling 78' will also have moved through a corresponding horizontal distance, but in a vertical plane parallel to but somewhat in front of the plane of movement of the crosshead 55. The torch on the end of the rod 280 will have moved to 285, an amount also equal to the distance A. After the pipe 270 and shaft 32 rotate from 90° to 180°, the crosshead 55 will be at 278 and the coupling 78' will be at 286. The coupling 78' will have moved back horizontally an amount equal to distance A, and the torch will have returned from 285 to 284. When the pipe rotates from 180° to 270°, the torch again moves from 284 to 285, and on completion of the pipe rotation from 270° to 360°, the torch again returns to 284.

It will also be observed that the torch holder in all positions is directed toward the point 287. This motion of the torch holder 194 is effected by the particular construction of the tool carriage previously described, and is for the purpose of forming the bevel on the end of the cut, so that the end wall of the nozzle is properly beveled to fit the outside surface of the main pipe.

Figs. 36 and 37 show respectively, an elevation and plan of the parts in the positions shown in Fig. 35. The short curved solid lines 288 indicate that portion of the pipe which would be cut by the torch during a rotation of the pipe from its initial position through about 30° to a point where the universal joint 53 appears in position 274, and the rod 77' and the carriage 100 are in the position shown in the solid lines. The dotted lines 289, 289' represent the complete cut after the pipe 270 has been rotated through 360°. It will be noted that the dotted line 289', Fig. 37, which represents the projection on a horizontal plane of the completed cut after the pipe has made a complete rotation and returned to its initial position, is similar to the curved dotted line 283, Fig. 35, which represents the path described in a vertical plane by the coupling 78'. When the cut has been completed, that portion of the pipe to the left of the cut, Figs. 35, 36 and 37, is the nozzle 256 desired for making the T connection shown in Fig. 31.

The operation of the shaft 32, the counter shaft 32', and the vertical arms 46 and 46' will be understood from Figs. 38 and 53. Fig. 38 is a diagrammatic view showing these elements in solid lines in their initial position, and Fig. 53 is a plan view of the same parts in another position. In this particular embodiment of the invention, the fixed length of the arms 46 and 46', that is, the distance between the axis of the shaft 32 and the axis of the stub shaft 48, Fig. 4, is 11¾ inches. The effective length of the arms 51 and 51' is measured between the center of the universal joint 53 and the axis of the arms 56 and 57 of the crosshead 55. The length of the arms 51 and 51' is adjustable between 12 and 30 inches.

While considering Figs. 38 and 53, it should be understood that the vertical arms 46 and 46' are keyed to the shafts 32 and 32', and rotate therewith.

When the shaft 32 revolves clockwise, counter shaft 32' is rotated a corresponding angular distance in a counterclockwise direction by the cross shaft 35 not shown in Fig. 38. When shaft 32 is rotated in the direction of the arrow 290, arm 46 and the universal joint 53 move in the direction of the arrow 291, and the arm 46' and the universal joint 53' move in the direction of the arrow 292. During one complete revolution of both shafts, the universal joints 53 and 53' describe circles indicated by the dotted lines. It will be recalled that the weight of the coupling 78, rods 77 and arms 51 and 51' is balanced by the counter weight 95, Fig. 15. During the movement of the parts, the crossheads 55 and 55' are held spaced apart a fixed distance by the rods 77.

As the shafts begin to rotate, the crossheads 55 and 55' are drawn toward the plane of rotation of the arms 46 and 46'. When the arm 46 has rotated clockwise 90°, and the arm 46' has rotated counterclockwise 90°, the parts occupy the position shown in plan in Fig. 53. Hence, it will be seen that during a 90° rotation of the shafts, the coupling 78 will have moved down over the path of the dotted line 283 to the position 293 which is in a horizontal plane including the shafts 32 and 32'. As the rotation of the shaft 32 increases to 180°, the universal joints 53 and 53' occupy positions 294 and 295 which are directly underneath their initial positions, the same being true of the arms 51 and 51', and the crossheads 55 and 55', and the coupling 78 will have moved from 293 to 296. As the rotation of the shafts continues, the coupling 78 begins to retrace its path over the line 283 until, at some point in the rotation of the shafts between 180° and 270°, and the arms 46, 46', 51 and 51', and the rods 77 occupy the position shown in dotted lines. When the shafts have revolved 270°, coupling 78 will have returned to 293, and when one revolution of the shafts has been completed, all the parts will have returned to their initial positions shown in the solid lines. It will now be apparent why the crosshead 55 and the coupling 78' of Fig. 35 are constrained to move only in vertical planes, and follow the paths designated by the dotted lines 276 and 283.

The shaft and countershaft arrangement disclosed in this application is highly desirable because it effects the proper movement of the coupling 78 with a minimum of friction and back lash. Countershaft 32', arms 46' and 51', and crosshead 55' might be omitted and other means provided to maintain the motion of cross-head 55 in a vertical plane, and to transmit this motion to the carriage 100. However, mechanical difficulties are overcome, and friction is largely eliminated by the arrangement described.

The means for transforming the semi-elliptical motion of the coupling 78 into straight line motion will now be explained in connection with Fig. 39 which shows diagrammatically the carriage 100, angle adjusting frame 110, coupling 78, and the links connecting the coupling 78 to the frame 110. In this figure, the parts are shown in their initial position in the full lines. The shaft 32, arms 46 and 51 are also shown diagrammatically. As just described in connection with Figs. 38 and 53, during one rotation of the shaft 32, the coupling 78 follows the path represented by the line 283 to its lower end, i. e., to the position 296, and then retraces this path back to the initial position. As explained in the description of Figs. 15 and 16, the link connection between the coupling 78 and frame 110 is such that when frame 110 is disposed horizontally as in Fig. 15, the vertical motion of the coupling is absorbed by the links 120 and 125, but the horizontal component of any movement of the coupling is transmitted to the frame 110. Therefore, in Fig. 39, when the coupling 78 is moved from the position shown in the full lines to that shown in the dotted lines, the frame 110 is moved from its full line position to the dotted line position. As the frame 110 is connected to the carriage 100 through the bolt 114, the horizontal motion of the frame 110 is also imparted to the carriage 100. When the coupling 78 is moved horizontally over the distance B, the carriage 100 is also moved over a corresponding distance. The maximum horizontal motion of the coupling 78 is designated as the distance C. Thus, during one complete revolution of the shaft 32, the coupling 78 and the carriage 100 move to the right a distance equal to C, then back to the left over the distance C, then again to the right a distance equal to C, and then back again to the left to the initial position. Hence, it will be apparent that during a complete rotation of a pipe in the machine, the coupling 78, the reciprocating carriage 100 and their associated parts may be said to pass through a complete cycle.

The operation of the machine for the cutting of a 24 inch outside diameter 23½ inch inside diameter nozzle to fit a 24 inch outside diameter main, when the axes of the nozzle and the main intersect at 90°, will now be described. These particular dimensions and angle of intersection are chosen for the immediately following explanation because the present embodiment of the invention has been designed with these dimensions and angle of intersection as a basis. These quantities therefore serve as points of reference from which adjustments of the machine may be made for the purpose of cutting connections between other mains and nozzles of various diameters and angles of intersection. The specific connection selected, i. e., the equal diameter and the right angular intersection, is the simplest form of connection and one frequently encountered in practice. Further, this particular connection may be cut without any change in the lengths of arms 51 and 51', of Fig. 8, or of the position of the angle adjusting frame 110 of Fig. 15.

When cutting connections and T's, such as shown in Figs. 31 and 32, as distinguished from elbows as shown in Fig. 50, the index pin 232, Fig. 9, must be pulled out, and tailnut 246 loosened to release the arm 230 from cross shaft 35, and disconnect carriage 239 from cable 205. Index pins 47, Fig. 4, and 47', Fig. 1, are pushed in to engage the arms 46 and 46' with the shafts 32 and 32'. Index pin 226, Fig. 11, should be withdrawn to disconnect shaft 224 and pulley 227, thus permitting free rotation of the cable drum 206.

The operating handle 217 of the clamp carriage 191 is moved far enough to the right or left of the position shown in Fig. 28 to release the brake 221. There is play enough between the clamping member 212 and the extension 211 to permit the release of the brake 221 on a short movement of handle 217 without locking the carriage 191 to either strand of the cable. The carriage 191 is moved to the midpoint of the T-rail 151, and handle 217 is then returned to the vertical position to again lock the carriage to the T-rail 151. The crank 195 is now rotated sufficiently to bring the sliding nut 201, Fig. 25, to its forwardmost position. This brings the post 193 and the torch holder 194 to the forward edge of the machine immediately behind the T-rail and out of the way, so that the pipe to be cut may be placed between the head and tailstock without interfering with the torch holder.

The connection between the headstock 22 and the shaft 32 is broken by unscrewing the tailnut 33. The pipe from which the nozzle is to be cut is then placed between the headstock and the tailstock, and tightened securely in place by manipulation of the tailstock carriage and the hand wheels 18 and 30. The circumference of the headstock 22 is graduated into 360 degrees, and for convenience the pipe should be rotated until the zero mark on the headstock coincides with an index line on the upper surface of the guard rail 210. The head mechanism is now operated by the motor until the arms 46 and 46' are in the vertical position. The headstock and the shaft 32 are then locked together by tightening the tailnut 33.

The inside radius of a 24 inch outside diameter

¼ inch nozzle is 11¾ inches. This coincides with the fixed lengths of the arms 46 and 46'. The outside radius of a 24 inch outside diameter ¼ inch main pipe is 12 inches. If necessary, the clamps 58 and 58' of the crossheads 55 and 55' are loosened, and the crank handle 60 rotated sufficiently to move the crossheads to their innermost position, as shown in Fig. 8, thereby making the effective length of the arms 51 and 51' equal to 12 inches. This arm length, as previously mentioned, is the distance between the center of the universal joint 53, and the axis of the arms 56 and 57. The crossheads are then clamped in this position. It should also be observed that the arms 51 and 51' lie in the same vertical plane as the shafts 32 and 32' respectively, that is, the arms 51 and 51' should be in their outermost position with respect to the longitudinal axis of the head mechanism, and appear in plan as shown in solid lines in Fig. 8.

The coupling 78, the frame 110, the carriage 100 and their associated parts are now in the position shown in Fig. 15. The indicator 130, Figs. 23 and 24, in this adjustment shows 90°, because it will be recalled that the nozzle is being cut to intersect a main pipe at an angle of 90°, for example, such as shown in Fig. 31. It may now be considered that the axis 259 of the main pipe 255, Fig. 31, is an imaginary line through the center of coupling 78, Fig. 39, lying at an angle of 90° to shaft 32, and that this imaginary line through the coupling and shaft 32 bear the same relation to each other as the intersecting axes in Fig. 31.

After noting that the cables 228 and 205 are evenly distributed on the pulley 227 and drum 206, respectively, the index pin 226, Fig. 11, is pushed in to connect the carriage 100 with the shaft 224 and drum 206.

Assume that it is desired to cut a nozzle of length D, Fig. 31, D equalling, for example, 5 feet. The tool carriage 11 is unlocked from the bed rails by moving the handle 166 down to the horizontal position shown in Fig. 27. The upper horizontal flange of the guard rail 210 is graduated into feet and inches, the zero being opposite the flat face of the headstock 22. An index mark on the upper face of the extension 211 of carriage 191, Fig. 26, registers with the graduations on the top of rail 210. Each step on the movable jaws of the headstock is 1 inch high. If, for example, the end of the pipe is 3 inches from the face of the headstock, the proper reading on the scale on rail 210 for a 5 foot nozzle would be 5 feet 3 inches. The tool carriage 11 is therefore shifted along the bed rails until the index mark on extension 211 registers with the 5 feet 3 inch mark on rail 210. The tool carriage 11 is then locked to the bed rails by moving the handle 166 upwardly, and tightening the screw 175 against the segment 176.

The crank 195 is now manipulated sufficiently to move the torch holder 194 toward the center post 180 until the tip of a torch in the holder would be spaced about ⅜ of an inch from the face of the pipe. Hence in this instance, the torch holder 194 is slightly more than 12 inches from the axis of the pipe, and is now in a position corresponding to 284, Fig. 35.

From Figs. 11 and 21, it will be seen that a movement of the carriage 100 to the right effects a clockwise rotation of the shaft 224 and the rope drum 206. Therefore, when the carriage 100 moves toward the tailstock, the rope drum 206 revolves clockwise, and the upper strand of the cable 205 also moves to the right and toward the tailstock. As the torch must necessarily move first toward the tailstock in making the cut, the operating handle 217 of the carriage 191 should be pulled away from the pipe in the machine or toward the operator to lock the carriage 191 to the upper cable, and release the brake 221.

When the cutting torch is ready and in position in the holder, the motor is started. The arms 46 and 51, 46' and 51', the rods 77 and the coupling 78 operate as described in connection with Fig. 38. The horizontal motion of the coupling 78 is transmitted to the carriage 100 in the manner described in connection with Fig. 39. As the length of the arms 51 and 51' in this instance is 12 inches, the distance C, Fig. 39 is also 12 inches. The motion of the carriage 100 is transmitted to the carriage 191 through pulley 227, shaft 224, drum 206 and cable 205, and thence to the torch holder 194 through the torch holder carriage 192.

During 90° of rotation of the pipe, the torch travels from its initial position corresponding to 284, Fig. 35, toward the tailstock approximately 12 inches to a position corresponding to 285, Fig. 35. In the interval in which the pipe rotates between 90° and 180°, the torch is drawn back to its initial position. As the pipe revolves between 180° and 270°, the torch again moves toward the tailstock approximately 12 inches to a position corresponding to 285, Fig. 35. During the rotation of the pipe between 270° and 360°, the torch again returns to its initial position.

The cut is not made continuous all the way around the pipe. Three or four short sections about ¾ inch long are left uncut. This is obviously necessary to prevent the pipe from falling out of the machine. After the pipe has been taken down, the solid sections are cut by hand. The required nozzle is that portion of the pipe which was adjacent the headstock when the pipe was in the machine.

It has been previously mentioned that, in the present embodiment of the invention, the ratio of the diameters of the pulley 227 and the cable drum 206 is as 11¾ is to 42. The reason for this relation will now be apparent from the foregoing description of operation, when considered with the immediately following discussion.

The cutting of an 11¾ inch inside radius nozzle to fit a 12 inch outside radius main has just been explained in detail, and it has been noted that the length of the arm 46 was 11¾ inches, and that the length of the arm 51 was 12 inches. It has also been observed that these particular arm lengths have caused the carriage 100 to travel back and forth over the distance C, Fig. 39, in this instance equalling approximately 12 inches. Although more will be said hereinafter about adjusting the machine to cut connections between pipes of various diameters, it may be stated at this point that where it is desired to cut connections between pipes, the radii of which are to each other as 11¾ is to 12, no change in the ratio between the length of the arm 46 and the length of the arm 51 is necessary. One example of this is where it is desired to cut a 35½ inch inside diameter nozzle to fit a 36 inch outside diameter main. Though mathematically not strictly accurate, for the practical purposes of this invention, it may be said that 11¾ is to 12 as 17¾ is to 18. That is, where the radii of connecting nozzle and main are to each other as 11¾ is to 12, the 12 inch adjustment of the arm 51 need not be changed. Obviously, as long as there is no change in the length of arms 51 and 51', carriage 100 will move as before, and travel over the same distance C, Fig. 39.

The line of intersection between a 36 inch outside diameter main and a 35½ inch inside diameter nozzle has the same form as the intersection of a 24 inch outside diameter main and a 23½ inch inside diameter nozzle except that the former is larger in size than the latter. Now, if we have a 36 inch pipe in the machine, the torch holder 194 must travel through a proportionally greater longitudinal distance than when cutting a 24 inch pipe. As the adjustment of the arms 46 and 51 remains as before, and the carriage 100 moves through the same distance as when cutting a 24 inch outside diameter pipe, some means between the carriage 100 and the torch holder must be provided for proportionally increasing the longitudinal travel of the torch holder.

In the present machine the perpendicular distance between the axis of a pipe in the machine and the clamp carriage 191 is 42 inches. Consequently, in order to cut larger nozzles, up to approximately a 40 inch radius, with the same movement of the carriage 100, the horizontal travel of the clamp carriage 191 and torch holder 194 must be increased proportionally. The travel of the carriage 191 is increased over that of carriage 100 in the proportion of 11¾ to 42 by making the diameters of pulley 227 and drum 206 bear the same ratio to each other as 11¾ is to 42.

Fig. 41 is a vertical elevation of two pipes of equal diameters, the axes of which intersect at an angle of 45°. The operation of the machine for cutting such an intersection where the outside diameters of the pipes are 24 inches, for example, will now be explained.

The length of pipe from which the nozzle N is to be cut is fixed in place between the head and tailstocks, and the headstock released from the main shaft 32 by loosening the tailnut 33. Index pins 47 and 47' are pushed in, pins 226 and 232 pulled out, and tail nut 246 loosened if not already unscrewed. The motor is operated until the arms 46 and 46' are vertical, and the headstock is then locked to the main shaft 32 by tightening the tailnut 33. The crossheads 55 and 55' are left as before, i. e., 12 inches from the universal joints 53 and 53', because the outside radius of the main M of Fig. 41 has been assumed to be 12 inches. The crank on screw 115, Fig. 15, is rotated until the frame 110 assumes an angle of 45° with the horizontal. The index mark 134, Fig. 23, will then register with the 45° mark on the segment 133.

After the foregoing adjustment has been made, the frame 110, coupling 78 and the associated parts appear as illustrated diagrammatically in the full lines in Fig. 42. The shaft 32 and the arm 46 maintain the same relative position, but the arm 51 has been dropped down and forms an angle of 45° with the vertical arm 46. The arm 51' is, of course, in a position which corresponds to that of arm 51. It may now be considered that the axis of the main M, Fig. 41, is an imaginary line through the center of coupling 78, Fig. 42, lying at an angle of 45° to shaft 32. In other words, shaft 32 and the imaginary line through the coupling bear the same relation to each other as the intersecting axes in Fig. 41.

When the parts are adjusted as shown in Fig. 42, the movement of crosshead 55 is illustrated in Fig. 40. In this figure, the counter shaft 32', the arms 46', arm 51', the connecting rods 77 and the coupling 78 have been omitted for simplicity.

The rotation of shaft 32 is clockwise as before, and after a rotation of 90°, the universal joint 53 is in the position 300, and the crosshead 55 has been drawn in so that its horizontal axis coincides with that of the shaft 32. After the shaft has revolved through 180°, the universal joint 53 and the crosshead 55 are directly beneath their initial positions, and the crosshead 55 is at 301. As the rotation of the shaft increases toward 270°, the universal joint 53 passes to the position 302, and the crosshead 55 retraces its path over the dotted line 303 to the position shown at 304. Further rotation of the shaft causes the continuance of the upward movement of the crosshead 55 until, at 270°, it again lies in the axis of the shaft 32. On completion of one revolution, the arm 46, arm 51 and crosshead 55 return to their initial positions shown in full lines. It will be apparent, therefore, that as the shaft 32 revolves, the cross head 55 moves over the path indicated by the dotted line 303 from its uppermost position shown in full lines, to its lowermost position indicated at 301, and then retraces its path returning to the initial position. The coupling 78 describes the same curve as the crosshead 55, except that it moves in a vertical plane which includes the longitudinal center of the head mechanism. The dotted line 303 has, therefore, been reproduced in Fig. 42 as 305. At this point it should be observed that the dotted line 305 and the solid line 306, Fig. 41, representing the vertical projection of the intersection of the two pipes, are similar in form, but reversed in direction.

The movement of the coupling 78 over the line 305 is transmitted to the carriage 100 as follows. As the center point of the coupling 78 moves over the dotted line 305 from 307 to 308, the movement of the coupling 78 in the direction of the arrow 309 is represented by the dotted line 310. During the same movement, the motion of the coupling in the direction of the arrow 311 is measured by the dotted line 312 disposed at a right angle to the line 310. The link connection between the coupling 78 and the frame 110 is, as previously explained, such that all the motion of the coupling 78 in the direction of the arrow 309 is absorbed, that is, not transmitted to frame 110, but that the movement of the coupling 78 in the direction of the arrow 311 is transmitted to the frame 110. If the frame 110 were free to move in the direction of the arrow 311, the frame would move in that direction over the length of the dotted line 312', which is equal in magnitude and direction to the line 312. But it will be recalled that the frame 110 is pivoted to the carriage 100 at 114, and that the carriage 100 can move back and forth only in a straight line in the direction of the arrows 313. Consequently, the frame 110 is not free to move in the direction of the arrow 311. Therefore, the frame 110 and the carriage 100 move to the right an amount equal to distance E which is the horizontal component of the line 312'. It will be noted that the distance E of Fig. 42 is equal to the distance E of Fig. 41. This equality holds in this instance because a 23½ inch inside diameter nozzle is being cut to fit a 24 inch main, and arms 51 and 51' are adjusted at the 12 inch length. For other adjustments for cutting other size pipes, the distance E, Fig. 42, would be proportional to a corresponding distance E of Fig. 41.

As the center of the coupling 78 moves over the line 305 from 308 to 314, the frame 110 and the attached carriage 100 are drawn to the left and, at the end of the downward motion of coupling 78, all the parts are then in the position shown in the full lines in Fig. 43. During this movement the bolt 114 connecting the carriage 100 and the frame 110 moves to the left over the distance F, which is equal to the distance F of Fig. 41. On the return movement of the coupling 78 from its lowermost position 314 to 308, the carriage 100 moves again to the right through the distance F. When the coupling 78 retraces its path from 308 to 307, the carriage 100 returns to its original position shown in full lines in Fig. 42. To summarize this motion briefly, the bolt connecting the carriage 100 and the frame 110 moves from its position shown in full lines, Fig. 42, first, to 315; second, to 316; third, back to 315; and fourth, back to its initial position.

This motion of the carriage 100 is transmitted to the clamp carriage 191 through the cable as previously described.

The initial adjustment of the clamp carriage 191 is as follows. When cutting the nozzle N, Fig. 41, the beginning of the cut corresponds to the point indicated at 317. It will be recalled that for all positions of the clamp carriage 191 on the T-rail 151, the tip of the torch holder 194 is constantly directed toward the intersection of the longitudinal axis of the pipe in the machine and a vertical line including the post 180 of the tool carriage 11. This intersection point is shown in Fig. 26 and also indicated in Fig. 41 as 180′. Consequently, if the cut is to be started at 317, Fig. 41, the torch holder must, when in that position, be directed toward point 180′. As the pipes in Fig. 41 intersect at 45°, it will be obvious that the angle (a) will equal 45°, angle (a) being the angle between a line from the tip of the torch holder to the intersection point 180′ and a horizontal line passing through point 180′ at a right angle to the longitudinal axis of the pipe in the machine. The carriage 191 is unlocked and shifted along the T-rail beyond the midpoint of the T-rail and toward the tailstock until it is in such position that the angle formed between a line from the tip of the torch holder to the point 180′ and the horizontal line through point 180′ and transverse to the pipe in the machine equals 45°. Carriage 191 is then locked to the T-rail in this position.

The T-rail 151 is graduated from its midpoint toward each end to indicate degrees for convenience in adjusting the carriage 191 when a nozzle intersecting the main pipe at an angle other than 90° is to be cut. The center of reference of the graduations is, of course, the intersection point 180′. A suitable index mark is provided on the carriage 191. When cutting connections between pipes intersecting at angles other than 90°, the angle (a) always equals the difference between the angle of intersection of the two pipes and 90°. In Fig. 41, angle (b) equals 45°, and the angle (c) also equals 45°. As the dotted line (d) is always drawn at a right angle to the longitudinal axis of nozzle N, angle (e) equals 90° less angle (c) equals 45°. Obviously, angle (a) equals angle (e), that is, angle (a) equals the difference between angle (c) and 90°. For a further example, if the longitudinal axes of the pipes intersect at 60°, angle (b) and angle (c) would then equal 60°. Angle (e) would equal 30° and angle (a) would also equal 30°, the difference between 90° and 60°.

After the carriage 191 has been locked to the T-rail in the adjusted position, the index pin 226 is then pushed in after it has been noted that the cables 228 and 205 are evenly distributed on the pulley 227 and drum 206.

Assume that the nozzle to be cut from the pipe already mounted between the head and tailstocks is to be of the length G, Fig. 41, which, for example, may be 5 feet. The tool carriage 11 is unlocked and shifted along the rails 13 until the index mark on extension 211 registers with the graduation on the top of rail 210 which represents 5 feet plus the distance between the end of the pipe and the flat face of the headstock. The tool carriage 11 is then locked to the rails 13. The torch holder 194 is moved in toward the pipe by means of crank 195 until the tip of a torch in the holder is about 3/8 of an inch from the pipe. The torch is then adjacent the point on the nozzle indicated at 317, Fig. 41. The operating handle 217, Fig. 26, is then pulled toward the operator to lock the carriage 191 to the upper strand of the cable 205.

When the motor is started, the pipe revolves with the shaft 32, and the torch in the holder moves toward the tailstock. At the end of 90° of rotation of the pipe, the torch will have moved from its initial position toward the tailstock, an amount equal to distance E, Figs. 41, 42 and 43. During rotation of the pipe between 90° and 180°, the torch moves back toward the headstock over the distance F. On the rotation of the pipe to 270°, the torch again moves toward the tailstock an amount equal to the distance F. On completing the rotation from 270 to 360°, the torch again moves toward the headstock through the distance E, and returns to its initial position. For all positions of the torch holder, the flame of the torch is constantly directed toward the intersection of the longitudinal axis of the pipe and a vertical line including the center post 180 of the tool carriage, thus beveling the end of the cut so as to effect a substantially perfect fit between the end wall of the cut and the curved outer surface of the main pipe. That portion of the pipe adjacent the headstock is the required nozzle N of Fig. 41.

For cutting connections where the 24 inch pipes intersect at any other angle between 45° and 90°, the operation is the same except that the frame 110 is adjusted by screw 115 until the indicator 130 shows the angle of the desired intersection, and the carriage 191 is initially adjusted as previously described.

The description so far has been limited to the cutting of 24 inch nozzles to fit 24 inch mains. Within certain limits any size nozzle may be cut to fit any size main pipe by adjusting the length of the arms 51 and 51′, provided, however, that the axes of pipes also intersect.

Let it be required to cut a 20 inch outside diameter nozzle to intersect a 26 inch outside diameter main. The length to which the arms 51 and 51′ must be adjusted may be determined from the following formula:

$$(1) \quad L = 11\tfrac{3}{4} \times \frac{R}{r}$$

where L equals the required length of the arms, R equals the outside radius of the main, and r equals the inside radius of the nozzle. In the example given, if the wall of the nozzle is 1/4 inch thick, as is usually the case where pipes of these diameters are used in gas plants, r equals 9¾, and R equals 13. Substituting these values in (1), it is found that L equals 15⅝ inches.

The tailnuts 59 and 59′ are loosened, and the crossheads 55 and 55′ moved out on the arms 51 and 51' by means of the crank 60, until the distance between the center of the universal joints 53 and 53' and the axis of the arms 56 and 57 of the crossheads equals 15⅝ inches. The tailnuts 59 and 59' are then tightened. It should be observed that the arms 51 and 51' are in the same vertical planes as the shafts 32 and 32', respectively. The frame 110 is adjusted in accordance with the angle of intersection of the required connection, and the machine is then operated as previously described.

The above formula is derived as follows. To avoid numerous mechanical difficulties, the lengths of the arms 46 and 46' are fixed. In this particular embodiment of the invention, these arms are 11¾ inches long. When the crossheads 55 and 55' are in the innermost position, the effective length of the arms 51 and 51' is 12 inches. The inside radius of a 24 inch nozzle having a wall ¼ inch thick is 11¾ inches. The outside radius of a 24 inch main pipe is 12 inches. Hence, as previously mentioned, the present embodiment of the invention is designed to cut a 24 inch nozzle to fit a 24 inch main without adjustment when the arms 51 and 51' are of minimum length. It is now obvious that the ratio of the length of the arm 46 to the length of the arm 51 is the same as the ratio of the inside radius of the nozzle to the outside radius of the main. This proportion may be written:

(2) $11\tfrac{3}{4} : 12 = r : R$ where $r$ is the inside radius of the nozzle, and $R$ is the outside radius of the main. If $r$ and $R$ are variables, which is the case in practice, and 11¾ a constant (the fixed length of arm 46), and if the proportion in (2) is to be maintained, the fourth member of the proportion, i. e., the length of the arm 51 must also be a variable. Hence (2) becomes (3) $11\tfrac{3}{4} : L = r : R$ where L equals the length of arm 51. Evaluating (3), we get (1) $L = 11\tfrac{3}{4} \times \dfrac{R}{r}$ In order to avoid the necessity of solving formula (1) in the shop to determine the adjustment of the arms 51 and 51' for cutting any particular intersection, a table should be prepared which shows the value L for all variations of R and r. It will be convenient if such a table is made to show along the left vertical edge, the outside diameters of main pipes from 6 inches at the top of the sheet and increasing consecutively to 120 inches at the bottom. The top horizon line should then show outside diameters of nozzles, ranging consecutively from 6 inches at the left end to 60 inches at the right end. Such a table shows immediately the required value of L for all variations of R and r which would ordinarily be encountered in practice.

It is often necessary to cut connections where the axes of the pipes do not intersect. For example, Figs. 46 and 47 show in plan and elevation two intersecting pipes, the longitudinal axes of which do not intersect, but are offset from each other by the distance H. The nozzle N of Figs. 46 and 47 may be cut to fit the main pipe M by moving the crossheads 55 and 55' from the position shown in Fig. 8 to that shown in Fig. 44 where the amount of the offset K is determined from the following formula:

(4) Offset of crosshead—K, Fig. 44=

$$24 \times \dfrac{\text{Offset of nozzles from main}}{\text{Diameter of nozzle}}.$$

This formula is derived as follows: When the machine is adjusted to cut a 23½ inch inside diameter nozzle to fit a 24 inch outside diameter main as shown in Figs. 4 and 8, it will be observed that the following proportion exists:

(5) Diameter of nozzle: 24, the outside diameter of the particular nozzle set in the machine =offset of crosshead 55: offset of nozzle. Of course in this particular setting of the machine, the offset of the nozzle, and the offset of the crossheads from vertical planes including shafts 32 and 32' are both equal to zero, because, as adjusted in Fig. 8, the machine is set to cut a nozzle, the axis of which intersects and is not offset from the axis of the main pipe. Nevertheless, the proportion in (5) exists, and holds true for all sizes of pipes and amounts of offsets regardless of whether some of its factors are equal to zero under some adjustments of the machine.

In (5), 24 is a constant; the "diameter of nozzle" and the "offset of nozzle" are variables, depending upon the specific cut to be made; and the offset of crosshead 55 is the unknown. Thus, solving (5) for the offset of crosshead, we get the formula in (4).

Having obtained the offset K in Fig. 44, for any particular connection, the adjustment and operation of the machine is as follows: Disconnect the headstock and the main shaft. Push in the index pins 47 and 47', and pull out index pins 226 and 232. The clamp carriage 191 is then placed again at the midpoint of T-rail 151 because the pipes in Figs. 46 and 47 intersect at 90°, and the torch holder moved forward adjacent rail 151 as before. Place the pipe from which the nozzle N, Fig. 47, is to be cut between the head and tailstocks, and operate the motor until the arms 46 and 46' are in the vertical position. Then lock the headstock and the main shaft by tightening the tailnut 33.

Tailnuts 59 and 59', and the nuts of the clamps 76, Fig. 8, of both crossheads are loosened. The crossheads are moved along the rods 77 toward the longitudinal center of the head mechanism an amount equal to the required offset K. The length of the arms 51 and 51' is determined from the formula (1) according to the diameters of the main and the nozzle, and the distance between the universal joints 53 and 53' and the crossheads along the arms 51 and 51' adjusted accordingly. The tailnuts 59 and 59', and the nuts of the clamps 76 are then tightened. For the purpose of this example it will be assumed that the nozzle and main of Figs. 46 and 47 intersect at a right angle, in which case the frame 110 will be adjusted as shown in Fig. 15, and the indicator 130 will read 90°. It will be understood, however, that if the nozzle and main meet at some angle other than a right angle, it is only necessary to set indicator 130 at the proper angle to cut the desired intersection and to set carriage 191 in its proper initial position.

The index pin 226 is then pushed in to lock carriage 100 to the drum 206 and cable 205, after it has been observed that cable is evenly distributed in the drum.

The tool carriage 11 should now be unlocked from the bed rails, and shifted until the distance between the end of the pipe adjacent the headstock and the index mark on the top of extension 211 equals P, Fig. 47, it being assumed that P is the length of the nozzle required. The tool carriage 11 is then locked to the bed rails, and the carriage 191 clamped to the upper strand of the cable by pulling the handle 217 away from the pipe. The torch holder is then moved in toward the center post 180, and is placed immediately adjacent the pipe in a position corresponding to the point 318, Figs. 46 and 47, which is the beginning of the cut.

The operation of the arms 51 and 51' and the coupling 78 in the adjustment just described will be understood from the consideration of Figs. 44, 45 and 54. Fig. 44 is a plan view of the arms 51 and 51', the coupling 78 and their associated parts in several different positions. The shaft 32 revolves clock-wise and the shaft 32' revolves counterclock-wise at equal angular velocity as before. When the shaft 32 rotates, say through 25°, the universal joints 53 and 53' move toward each other, and assume positions indicated at 320 and 321. Coupling 78 moves from its initial position shown in Fig. 45 to 322. After the main shaft 32 has rotated through 90°, the universal joint 53 is in the position indicated at 323. Coupling 78 is now at 324. When the universal joint 53 is in the position indicated at 325, the coupling 78 is at 326. When the main shaft has rotated 180°, the universal joint 53 is at 327, directly beneath its initial position, and the coupling 78 is at 328. After the main shaft has rotated through 270°, the universal joint 53 is at 329, and the coupling 78 has started its upward movement, and is in the position indicated at 330. After the shaft has made one complete revolution, the parts will have returned to their initial positions shown in the solid lines in Figs. 44, 45 and 54.

It is therefore apparent that during one revolution of the shafts 32 and 32', the coupling 78 moves over the dotted line 331, Fig. 45, in the direction indicated by the arrowheads. The curvature of this line is proportional to that of the line 332 of Fig. 47 which is the vertical projection of the line of intersection between the nozzle and the main. It is to be here again noted that the dotted line 331 and the line 332 are similar in form, but reversed in direction. Figs. 44, 45 and 54, and Figs. 46 and 47 are not drawn to the same scale.

The motion of the torch holder as the pipe rotates through 360°, and as the coupling 78 passes over line 331, is as follows: During the rotation of the pipe between zero and 90°, the torch holder moves toward the headstock a distance proportional to R, Fig. 45, and then away from the headstock through a distance proportional to S. As the pipe rotates from 90° to 180°, the torch holder travels back toward the headstock over a distance proportional to S, and then away from the headstock over a distance proportional to R, thus returning the torch to its initial position. As the pipe rotation continues from 180° to 270°, the torch moves away from the headstock through a distance proportional to T. During the rotation of the pipe from 270° to 360°, the torch again travels toward the headstock, and returns to its initial position.

When making the offset adjustment just described, one precaution must be taken. The amount of the offset K, Fig. 44, plus 12 must never exceed the effective length of the arm 51. The reason for this will be obvious from a consideration of Fig. 44. The distance from the point 329 to 320 equals 12 plus K. The length of the arm 46 for the present purpose may be considered as 12 inches. After the adjustment of the crossheads 55 and 55' has been made, the distance between them measured on the rods 77, remains fixed. It will be seen that if the horizontal distance between 329 and 320 exceeds the length of the arm 51, the total horizontal distance between 329 and 333 will exceed the combined length of the arms 51 and 51' and the rods 77 when the coupling 78 is in its innermost position. Consequently, to avoid a break in the machine, the length of arm 51 must always be equal to or greater than 12 plus K.

It will be noted that in all examples thus far described, the pipe has been cut in such manner that the end of the cut is a line lying in more than one plane.

The operation of the machine for cutting elbows, such as shown in Fig. 50, will now be described.

It may be assumed that the lengths AA, BB, CC and DD, and the angle 15° of Fig. 50 may be determined from the shop drawing.

The headstock is disconnected from the main shaft 32, and the index pins 47, 47' and 226 are pulled out to disconnect the vertical arms 46 and 46', and the carriage 100 from the motor. The index pin 232, Fig. 9, is pushed in to connect arm 230 and cross-shaft 35. The arm 230 is then rotated until it is in the exact vertical position pointing downwardly as in Figs. 9 and 10. The clamp carriage 191 is shifted to the midpoint of the rail 151, and locked thereto by throwing the operating handle 217 to the vertical position. After observing that the cable 205 is evenly distributed on the drum 206, the carriage 239 is locked to the lower strand of the cable by tightening the tailnut 246 of clamp 243. The torch holder 194 is then moved forward as far as possible from the center post 180. A pipe, the overall length of which equals or exceeds the sum of the lengths AA, BB, CC, and DD is placed between the head and tailstocks, and the headstock is rotated until the zero mark on the circumference thereof registers with the index mark on the top of the rail 210. The headstock is then locked to the main shaft 32 by tightening tailnut 33. The torch holder is now moved up to the face of the pipe by turning the crank handle 195. A marker, consisting of a center punch in a guide with a coiled spring so arranged that the center punch will move forward when struck with a hammer, is placed in the torch holder. The index mark on the extension 211 of the carriage 191 corresponds with the center of the torch holder when carriage 191 is at the midpoint of rail 151. The tool carriage 11 is unlocked from the bed rails and shifted along until the index mark on extension 211 registers with the graduation on top of rail 210 which represents length AA plus 1 inch for each step of the movable jaws between the end of the pipe and the flat face of the headstock. Then mark off the distance AA on the pipe by means of the punch in the holder 194. Move the carriage 11 along the bed rails toward the tailstock and successively mark off the lengths BB, CC and DD.

It has been assumed that the angle of the required cut is 15°. The machine may be set to cut the pipe at an angle of 15° to its axis by turning the knob 234 on the screw 233, Fig. 9, until an index mark on the sleeved member 236', Fig. 12, registers with the 15° mark graduated on the side of the arm 230 as shown in Fig. 9.

The arm 230 is graduated to indicate degrees with a zero mark at the shaft 35, and a 23° mark at the end of the arm. When cutting elbows, the torch holder is always initially placed at the center of the cut as at 335, Figs. 51 and 52. With such a starting point, it is obvious that in order to complete the cut at 15°, the torch holder 194 must travel through 15° on either side of the transverse center of the tool carriage 11. That is, as shown in Fig. 49, where 180 is the center post of the carriage 11, the torch holder 194 must move from the position shown in the solid lines first, to 336; second, in the opposite direction to 337; and then return to its initial position. In other words, if the angle of the cut is 15°, the angle between a transverse line through the center of the carriage 11, and a line drawn through post 180 and either extreme position of the torch holder must be also 15°.

The graduations on the arm 230 are obtained as follows: In the machine described, the distance EE, Fig. 49, between the center post 180 and the extreme outward position of the torch holder 194, when the post 193 is immediately adjacent the rail 151, is 42 inches. Consequently, if it is required to cut a 42 inch radius pipe on a plane disposed at 15° to the axis of the pipe, torch holder 194 must move to 336, 337 and return to its initial position, thus passing over a distance equal to four times the distance FF. From Fig. 49 it is apparent that (6)    $FF = 42 \tan 15° = 11.3$ inches Therefore, the effective length of the arm 230, Fig. 48, must be 11.3 inches. Consequently, 11.3 inches from the shaft 35, the arm 230 is marked 15°. Other graduations for arm 230 are determined by substituting values from 1° to 23° for the 15° in (6). The highest angle at which a pipe may be cut on the present embodiment of the invention is 23°. This is obviously only limited by the length of the arm 230. By increasing the length of arm 230 within such limits as not to interfere with the operation of other parts of the machine, pipes may be cut for elbows at correspondingly higher angles.

It will be apparent, therefore, when making cuts up to 23°, it is only necessary to adjust the index mark on the member 236' to register with the graduation corresponding to the angle of the cut. It will also be evident from Fig. 10, that the carriage 239 moves back and forth on the rail 241 within limits determined by the adjustment of the roller 237 with respect to the shaft 35. The motion of the carriage 239 is transmitted to the carriage 191 through clamp 243 and the cable 205. In Figs. 48 and 49, the carriage 239, the clamp 243 and the cable transmitting the movement of arm 230 to the torch holder 194 are represented diagrammatically by the connection 338.

If a pipe of a diameter less than 42 inches is to be cut at 15°, the index mark on 236' is set at 15° as before. When connected by the cable, the movements of carriages 191 and 239 are identical with respect to distance, but directions may be opposite depending upon whether the carriage 191 is locked to the upper or lower strand of cable 205. If the diameter of the pipe being cut is less than 42 inches, the torch holder 194 would be nearer the center post 180, according to the diameter of the pipe, but would still travel through 15° to either side of the transverse center of the tool carriage 11.

To return now to the cutting of the pipe already in the machine and marked off according to Figs. 50 and 51, the tool carriage 11 is moved back toward the headstock until the torch holder is immediately adjacent the first mark at 335, and the marker in the holder is replaced by a torch. Carriage 11 is locked in this position to the bed rails, and clamp carriage 191 should be locked to the lower strand of the cable by pushing handle 217 toward the pipe. It will be observed that as the pipe rotates clockwise, looking from the head of the machine, the torch must make its initial movement toward the tailstock. As the arm 230 rotates counterclockwise, looking from the front of the machine, and has been previously set in the vertical position pointing downward, the initial movement of the carriage 239 will be toward the tailstock. The lower strand of the cable is locked to the carriage 239, and consequently the initial movement of the lower strand of the cable will be toward the tailstock; and the initial movement of the upper strand will be away from the tailstock. Hence, the necessity of first locking the carriage 191 to the lower strand of the cable is apparent. When the torch is ready, the motor is started and the cut made, leaving as usual three or four solid sections to prevent the pipe from falling out of the machine. After the first cut is finished, the carriage 191 is unlocked from the cable by throwing the handle 217 to the vertical position, and the carriage 11 is unlocked from the bed rails by pushing down the handle 166. Carriage 11 is shifted toward the tailstock until the torch holder is at the second mark 339, and then locked to the bed rails. The carriage 191 is now clamped to the upper strand of the cable by pulling the operating handle 217 away from the pipe. As the pipe always rotates in the same direction, it will be necessary to clamp carriage 191 to the upper cable, so that the torch will be initially moved toward the headstock when making the second cut. The third cut is started at the third mark 340. This time the carriage 191 is again locked to the lower cable.

After the third cut has been completed, the carriage 11 is moved along the bed rails until the torch holder is adjacent the mark at 341. As this cut is to be made at a right angle to the axis of the pipe, the carriage 191 should be left locked in fixed position at the midpoint of the rail 151 by permitting the handle 217 to remain in the vertical position. The pipe is rotated through 360° with the torch in the fixed position, thus effecting a cut at a right angle to the axis of the pipe. The dotted lines in Fig. 51 represent the completed cuts, and it will be observed that the end of each cut is a line lying wholly within a single plane disposed at an angle to the axis of the pipe. Before taking the pipe out of the machine, the headstock is disconnected from the main shaft, the pipe rotated through 180°, and center lines marked on the several pieces to facilitate setting up. The pipe is then taken out of the machine, and the solid portions cut by hand. Obviously, if the pipe placed in the machine at the start were of a length equal to the sum of lengths AA, BB, CC and DD, the last right angle cut would have been unnecessary.

The machine may also be employed for cutting conical pipe such as used in reducer elbows. In this case the adjustments and operation for the machine are the same as for cutting cylindrical elbows except that the crank 195 must be manipulated constantly during the rotation of the pipe to keep the tip of the torch or other cutting tool at the proper distance from the wall of the pipe.

In the appended claims the term "complete cycle" is intended to define any movement of an element of the machine in which the element returns to its initial position after one complete operation of the machine, i. e., one complete rotation of a pipe in the machine. The term "complete reciprocation" is intended to have the same meaning as the term "complete cycle" except that the movement takes place in a straight line. As an illustration of the latter, it may be said that the torch holder 194, Fig. 49, passes through a complete reciprocation as it moves from the initial position shown in the solid lines first, to 336, second, to 337 and then back to the initial position. Again, in Fig. 39, the carriage 100 passes through a complete reciprocation as it moves from its initial position through the distance C, then back to its initial position, and then again through the distance C and back to the initial position.

In the foregoing description, numerous specific dimensions of certain parts of the machine have been mentioned. Such dimensions are obviously subject to variation, and have been expressly stated herein only by way of example to facilitate an explanation of the operation of the machine and the relation existing between certain parts thereof, and are not to be considered in any way as limiting the invention.

I claim:

1. In a pipe cutting machine, means for supporting and rotating a pipe, a cutter mounted immediately adjacent the surface thereof, a main shaft connected to said pipe rotating means, an arm connected to said shaft, a second arm connected to the first arm, a member mounted on said second arm, and means disposed between said member and the cutter for adjusting the initial angular relation between said arms and for transmitting motion from said member to the cutter as the pipe rotates.

2. In a pipe cutting machine, means for rotatably supporting a pipe, a cutter mounted immediately adjacent the surface thereof, a main shaft, means for rotating the pipe and the shaft, an arm rotated by said shaft, a second arm connected to the first arm, a crosshead mounted on the second arm, means for restricting the movement of the crosshead to a single plane when the shaft rotates, and means for transmitting motion from the crosshead to the cutter.

3. In a pipe cutting machine, means for rotatably supporting a pipe, a cutter mounted immediately adjacent the surface thereof, a main shaft, means for rotating the pipe and the shaft, an arm rotated by said shaft, a second arm connected to the first arm, a crosshead mounted on the second arm, means for restricting the movement of the crosshead to a single plane when the shaft rotates, and means for adjusting the initial angular relation between said arms and for transmitting motion from the crosshead to the cutter.

4. In a pipe cutting machine, means for rotatably supporting a pipe, a cutter mounted immediately adjacent the surface thereof, a main shaft, means for rotating the pipe and the shaft at equal angular velocities, an arm connected to said shaft, a second arm connected to the first arm, a crosshead mounted on the second arm, means for restricting the movement of the crosshead to a single vertical plane when the shaft rotates, and means for reciprocating the cutter synchronously with the movement of the crosshead.

5. In a pipe cutting machine in combination with means for rotatably supporting a pipe, a head mechanism comprising a movable carriage, a coupling member connected to said carriage, means including a pair of oppositely rotating shafts and arms connected thereto for rotating the pipe and moving the coupling through a complete cycle during a complete rotation of the pipe.

6. In a pipe cutting machine in combination with means for rotatably supporting a pipe, a head mechanism comprising a movable carriage, a coupling member connected to said carriage, means including a pair of oppositely rotating shafts and arms connected thereto for rotating the pipe and for moving the coupling through a complete cycle in a single plane during a complete rotation of the pipe.

7. In a pipe cutting machine in combination with means for rotatably supporting a pipe, a head mechanism comprising a movable carriage, a coupling member connected to said carriage, means for supporting the coupling in any position, means for rotating the pipe, means for moving the coupling through a complete cycle during a complete rotation of the pipe including a pair of shafts, an arm connected to each shaft, an arm attached to each of said first mentioned arms, and a connection between the second mentioned arms and the coupling.

8. In a pipe cutting machine in combination with means for rotatably supporting a pipe, a head mechanism comprising a movable carriage, a coupling member connected to said carriage, means for supporting the coupling in any position, means for rotating the pipe, means for moving the coupling through a complete cycle during a complete rotation of the pipe including a pair of shafts, an arm connected to each shaft, an arm attached to each of said first mentioned arms, crossheads mounted on said second mentioned arms, means for adjusting the crossheads along the second mentioned arms, and a connection between the crossheads and the coupling.

9. In a pipe cutting machine in combination with means for rotatably supporting a pipe, a head mechanism comprising a movable carriage, a pair of shafts, means for rotating the shafts and the pipe, an arm connected to each of said shafts, an arm attached to the end of each of the first mentioned arms, crossheads mounted on each of the second mentioned arms, a rod connecting said crossheads, a coupling member mounted on said rod, means for supporting the coupling in any position, and a connection between the coupling and the carriage.

10. In a pipe cutting machine in combination with means for rotatably supporting a pipe, a head mechanism comprising a movable carriage, a pair of shafts, means for rotating the shafts and the pipe, an arm connected to each of the shafts, an arm attached to each of the first mentioned arms, crossheads mounted on each of said second mentioned arms, a rod connecting said crossheads, means for adjusting the crossheads along said rod, a coupling member mounted on said rod, means for supporting the coupling in any position, and a connection between the coupling and the carriage.

11. In a pipe cutting machine in combination with means for rotatably supporting a pipe, a head mechanism comprising a movable carriage, a pair of shafts arranged to rotate in opposite directions, means for rotating said shafts and the pipe, an arm connected to each of said shafts, an arm attached to the end of each of said first mentioned arms, crossheads mounted on each of said second mentioned arms, a rod connecting said crossheads, a coupling member mounted on said rod, means for supporting the coupling in any position, and a connection between the coupling and the carriage.

12. In a pipe cutting machine in combination with means for rotatably supporting a pipe, a head mechanism comprising a movable carriage, a coupling member connected to said carriage, means for supporting the coupling in any position, means for rotating the pipe, means for moving the coupling through a complete cycle during a complete rotation of the pipe including a pair of shafts, an arm connected to each of said shafts, an arm attached to each of said first mentioned arms and a connection between the second mentioned arms and the coupling, and means for adjusting the initial angular relation between said first and second mentioned pairs of arms respectively.

13. In a pipe cutting machine in combination with means for rotatably supporting a pipe, a head mechanism comprising a movable carriage, a pair of shafts, means connected to said shafts for rotating the pipe, an arm connected to each of said shafts, an arm attached to each of said first mentioned arms, crossheads mounted on each of said second mentioned arms, a rod connecting said crossheads, a coupling member mounted on said rod, means for supporting said coupling in any position and a connection between the coupling and the carriage including means for adjusting the initial angular relation between said first and second mentioned pairs of arms.

14. In a pipe cutting machine in combination with means for rotatably supporting a pipe, a head mechanism comprising a movable carriage, a shaft, means for rotating the shaft and the pipe, an arm connected to the shaft to rotate therewith, a second arm attached to said first mentioned arm, a movable coupling member, means for supporting the coupling in any position, a connection between the coupling and the second arm, and a connection between the coupling and the carriage including means for adjusting the initial angular relation between the arms.

15. In a pipe cutting machine in combination with means for rotatably supporting a pipe, a head mechanism comprising a movable carriage, a shaft, means for rotating the shaft and the pipe, an arm connected to the shaft to rotate therewith, a second arm attached to said first mentioned arm, a movable coupling member, means for supporting the coupling in any position, means for restraining the movement of the coupling to a single plane, a connection between the coupling and the second arm, and a connection between the coupling and the carriage including means for adjusting the initial angular relation between the arms.

16. In a pipe cutting machine in combination with means for rotatably supporting a pipe, a head mechanism comprising a movable carriage, a shaft, means for rotating the shaft and the pipe, an arm connected to the shaft to rotate therewith, a second arm attached to said first mentioned arm, a movable coupling member, means for supporting the coupling in any position, a connection between the coupling and the second arm, and means pivoted to the carriage and connected to the coupling for adjusting the initial angular relation between the arms.

17. In a pipe cutting machine in combination with means for rotatably supporting a pipe, a head mechanism comprising a movable carriage, a pair of shafts, and means for rotating said shafts and pipe, an arm connected to each of said shafts, an arm attached to each of said first mentioned arms, crossheads mounted on each of said second mentioned arms, a rod connecting the crossheads, a coupling member mounted on said rod, means for supporting the coupling in any position, and means disposed between and connected to the coupling and the carriage for adjusting the initial angular relation between the first and second pairs of arms.

18. In a pipe cutting machine in combination with means for rotatably supporting a pipe, a head mechanism comprising a movable carriage, a pair of shafts, and means for rotating said shafts and pipe, an arm connected to each of said shafts, an arm attached to each of said first mentioned arms, crossheads mounted on each of said second mentioned arms, a rod connecting the crossheads, means for adjusting the crossheads along said rod and along said second mentioned arms, a coupling member mounted on said rod, means for supporting the coupling in any position, and a frame pivoted to the carriage and connected to the coupling for adjusting the initial angular relation between the first and second pairs of arms.

19. In a pipe cutting machine in combination with means for rotatably supporting a pipe, a head mechanism comprising a movable carriage, a coupling member, operatively associated means for rotating the pipe and moving the coupling member through a complete cycle during a complete rotation of the pipe, and means including a connection between the carriage and the coupling member for changing the path of movement of the coupling member.

20. In a pipe cutting machine, means for supporting and rotating a pipe, a cutter disposed immediately adjacent the periphery of the pipe, means for moving the cutter longitudinally of the axis of the pipe synchronously with the rotation of the pipe, and means for continuously directing the cutter during the longitudinal movement thereof toward a fixed point.

21. In a pipe cutting machine, means for supporting and rotating a pipe, a cutter mounted immediately adjacent the periphery of the pipe, means for reciprocating the cutter synchronously with the rotation of the pipe, and means for continuously directing the cutter during the movement thereof toward a fixed point on the axis of the rotating pipe.

22. In a pipe cutting machine, means for supporting and rotating a pipe, a cutter, means for performing a complete reciprocation of said cutter during a complete rotation of the pipe, and means for continuously directing the cutter during the movement thereof toward a fixed point.

23. In a pipe cutting machine, means for supporting and rotating a pipe, a cutter, means for performing a complete reciprocation of said cutter during a complete rotation of the pipe, and means for continuously directing the cutter during the movement thereof toward a fixed point on the axis of the rotating pipe.

24. In a pipe cutting machine, means for supporting and rotating a pipe, a cutting tool holder, means for moving the holder longitudinally of the axis of the pipe synchronously with the rotation of the pipe supporting means, means for adjusting the path of movement of the holder with respect to the axis of the pipe supporting means, and means for continuously directing the holder during the movement thereof toward a fixed point.

25. In a pipe cutting machine, means for supporting and rotating a pipe, a cutting tool holder, means for reciprocating the holder synchronously with the rotation of the pipe supporting means, means for adjusting the path of reciprocation of the holder with respect to the axis of the pipe supporting means, and means for continuously directing the holder during the movement thereof toward a fixed point.

26. In a pipe cutting machine, means for supporting and rotating a pipe, a cutting tool holder disposed adjacent the pipe supporting means, means for moving the holder synchronously with the rotation of the pipe supporting means, and means for simultaneously altering the extent of the movement of the holder and the distance between the holder and the axis of the pipe supporting means.

27. In a pipe cutting machine, means for supporting and rotating a pipe, a cutting tool holder disposed adjacent the pipe supporting means, means for moving the holder synchronously with the rotation of the pipe supporting means, means for adjusting the distance between the holder and the axis of the pipe support, and means coacting with said adjusting means for increasing or decreasing the extent of movement of the holder in accordance with the adjustment of the holder with respect to the axis of the pipe supporting means.

28. A pipe cutting machine, means for supporting and rotating a pipe, a cutting tool holder disposed adjacent the pipe supporting means, means for reciprocating the holder synchronously with the rotation of the pipe supporting means, and means for simultaneously altering the extent of the reciprocation of the holder and the distance between the holder and the axis of the pipe supporting means.

29. In a pipe cutting machine, means for supporting and rotating a pipe, a cutting tool holder disposed adjacent the pipe supporting means, means for moving the holder synchronously with the rotation of the pipe supporting means, means for adjusting the holder with respect to the axis of the pipe supporting means, means for increasing or decreasing the extent of movement of the holder in accordance with the adjustment of the holder with respect to the axis of the pipe supporting means, and means for continuously directing the holder during the movement thereof toward a fixed point.

30. In a pipe cutting machine, means for supporting and rotating a pipe, a cutting tool holder disposed adjacent the pipe supporting means, means for reciprocating the holder synchronously with the rotation of the pipe supporting means, means for adjusting the holder with respect to the axis of the pipe supporting means, means for increasing or decreasing the extent of reciprocation of the holder in accordance with the adjustment of the holder with respect to the axis of the pipe supporting means, and means for continuously directing the holder during the movement thereof toward a fixed point on the axis of the pipe rotating means.

31. A pipe cutting machine comprising means for rotatably supporting a pipe, a head mechanism including a movable member, means for rotating the pipe and for synchronously causing said member to describe a closed path during a complete rotation of the pipe, and means controlled by the movement of said member for cutting the pipe so that a projection of the completed cut on a plane is similar to the path described by said member.

32. A pipe cutting machine comprising means for rotatably supporting a pipe, a head mechanism including a movable member, means for rotating the pipe and for synchronously causing said member to describe in a single plane a closed path during a complete rotation of the pipe, and means controlled by the movement of said member for cutting the pipe so that the projection of the completed cut on a plane disposed at a right angle to the first mentioned plane is similar to the path described by said member.

33. A pipe cutting machine comprising means for rotatably supporting a pipe, a head mechanism including a movable member, means for rotating the pipe and for synchronously causing said member to describe in a vertical plane a closed path during a complete rotation of the pipe, and means controlled by the movement of said member for cutting the pipe so that a projection of the completed cut on a horizontal plane is similar to the path described by said member.

34. In a pipe cutting machine, means for supporting and rotating a pipe, a cutter arranged to engage the circumferential surface of the pipe between the ends thereof, means for reciprocating the cutter in timed relation with the pipe rotating means comprising a shaft, means for rotating the shaft at the same angular speed as the pipe supporting means, an arm on said shaft, a roller adjustably mounted on said arm, a supporting rail, a carriage reciprocable on said rail, a vertical slot in said carriage adapted to receive said roller, a motion transmitting member adapted to be connected to said cutter and a clamp adapted to connect the carriage with the motion transmitting means.

35. A pipe cutting machine comprising means for supporting a pipe, a cutter, means for moving the cutter to cut the pipe on a line lying in more than one plane, and means for continuously directing the cutter during the movement thereof toward a fixed point whereby the end of the cut is bevelled.

36. A pipe cutting machine comprising a pipe holding device and a cutting device, means for moving one of said devices with the pipe and cutter in contact with each other for cutting the pipe on a line lying in more than one plane, and means for continuously directing the cutting during the movement thereof toward a fixed point whereby the end of the cut is bevelled.

37. A pipe cutting machine comprising a pipe holding device and a cutting device, means for reciprocating one of said devices with the pipe and cutter in contact with each other for cutting the pipe on a line lying in more than one plane, and means for continuously directing the cutter during the movement thereof toward a fixed point on the axis of the pipe whereby the end of the cut is bevelled.

38. A pipe cutting machine comprising a pipe holding device and a cutting device, means for synchronously moving said devices with the pipe and cutter in contact with each other for cutting the pipe on a line lying in more than one plane, and means for continuously directing the cutter during the movement thereof toward a fixed point whereby the end of the cut is bevelled.

39. A pipe cutting machine comprising a pipe holding device, and a cutting device, means for synchronously rotating one of said devices and reciprocating the other with the pipe and cutter in contact with each other for cutting the pipe on a line lying in more than one plane, and means for continuously directing the cutter during the movement thereof toward a fixed point on the axis of the pipe.

40. A pipe cutting machine comprising means for supporting and rotating a pipe, a cutter, mechanism for causing the cutter on rotation of the pipe to cut on the pipe an intersection line lying in more than one plane, means for adjusting said mechanism to cause the cutter on rotation of the pipe to cut a different intersection.

41. A pipe cutting machine comprising means for supporting and rotating a pipe, a cutter, mechanism for causing the cutter on rotation of the pipe to cut on the pipe an intersection line lying in more than one plane, means for adjusting said mechanism to vary the angle of the intersection cut.

42. A pipe cutting machine comprising means for supporting and rotating a pipe, a cutter, mechanism for causing the cutter on rotation of the pipe to cut on the pipe an intersection line lying in more than one plane, means for adjusting said mechanism to cause the cutter on rotation of the pipe to cut a different intersection, and means for continuously directing the cutter during the cutting operation toward a fixed point on the axis of the pipe.

43. A pipe cutting machine, comprising means for supporting and rotating the pipe about its longitudinal axis, an adjustable cutter, and means operated coordinately with the rotation of the pipe for reciprocating the cutter in a plane including the longitudinal axis of the pipe and oscillating the cutter in said plane through an arc equal to the angle of inclination of the desired cut with reference to said longitudinal axis.

44. A pipe cutting machine comprising means for rotatably supporting a pipe, a movable tool carriage and a cutting tool holder movable thereon, and a head mechanism including means for rotating the pipe supporting means and moving the tool holder, relative to the tool carriage, through a complete cycle during a complete rotation of the pipe.

45. A pipe cutting machine comprising means for rotatably supporting a pipe, a movable tool carriage and a cutting tool holder reciprocable thereon, and a head mechanism including means for rotating the pipe supporting means and moving the tool holder, relative to the tool carriage, through a complete reciprocation during a complete rotation of the pipe.

46. A pipe cutting machine comprising means for rotatably supporting a pipe, a movable tool carriage and a cutting tool holder movable thereon, means for adjusting the tool holder to a position immediately adjacent the periphery of a pipe in the pipe supporting means, and a head mechanism including means for rotating the pipe supporting means and moving the tool holder, relative to the tool carriage, through a complete cycle during a complete rotation of the pipe.

47. In a pipe cutting machine, the combination of a cutter adapted to be positioned adjacent the surface of a pipe to be cut, means for moving the cutter to cut on the pipe an irregular intersection line lying in more than one plane, said means comprising a reciprocable carriage, a pair of rotatable members, means for rotating said members, a stub shaft associated with each member and revolvable thereby, said members and said associated stub shafts being so arranged that on rotation of the members the stub shafts describe circular paths about the axes of rotation of said members, a rod associated with said stub shafts and operable thereby, a coupling member associated with said rod and movable by said rod and stub shafts, means for causing the coupling to move in a closed path lying in a plane, a connection between the coupling and the carriage, said connection being adapted to transmit to the carriage motion in one direction and to absorb motion of the coupling in another direction, and means to transmit motion of the carriage to the cutter to cut the pipe.

48. A pipe cutting machine, comprising means for supporting and rotating the pipe about its longitudinal axis, an adjustable cutter, and means operated coordinately with the rotation of the pipe for reciprocating the cutter in a plane including the longitudinal axis of the pipe and oscillating the cutter in said plane through an arc equal to twice the angle of inclination of the desired cut with reference to said longitudinal axis.

OLAV TWEIT.